US011359948B2

(12) United States Patent
Sabraoui et al.

(10) Patent No.: US 11,359,948 B2
(45) Date of Patent: Jun. 14, 2022

(54) TRANSDUCER ENCLOSURE TO PROTECT AND POSITION TRANSDUCER WIRING

(71) Applicant: Itron Global SARL, Liberty Lake, WA (US)

(72) Inventors: Abbas Sabraoui, Liberty Lake, WA (US); Michel Bottner, Liberty Lake, WA (US); Daniel Catherin, Liberty Lake, WA (US)

(73) Assignee: Itron Global SARL, Liberty Lake, WA (US)

( * ) Notice: Subject to any disclaimer, the term of this patent is extended or adjusted under 35 U.S.C. 154(b) by 459 days.

(21) Appl. No.: 16/588,817

(22) Filed: Sep. 30, 2019

(65) Prior Publication Data
US 2021/0003428 A1 Jan. 7, 2021

Related U.S. Application Data

(60) Provisional application No. 62/869,988, filed on Jul. 2, 2019.

(51) Int. Cl.
*G01D 11/24* (2006.01)
*G01F 1/66* (2022.01)
(Continued)

(52) U.S. Cl.
CPC ........... *G01F 1/662* (2013.01); *G01D 11/245* (2013.01); *G01F 15/14* (2013.01); *G01N 29/222* (2013.01);
(Continued)

(58) Field of Classification Search
CPC ....... G01F 1/662; G01F 15/14; G01D 11/245; G01N 29/227
See application file for complete search history.

(56) References Cited

U.S. PATENT DOCUMENTS

| 4,096,756 A | 6/1978 | Alphonse |
| 11,215,488 B2 * | 1/2022 | Sabraoui ............. G01N 29/222 |

(Continued)

FOREIGN PATENT DOCUMENTS

| CA | 2758843 A1 * | 10/2010 | ............. G01F 1/662 |
| EP | 2083250 | 7/2009 | |

(Continued)

OTHER PUBLICATIONS

Office Action for U.S. Appl. No. 16/588,858, dated Jul. 20, 2021, Sabraoui, "Multi-Material Transducer Enclosure", 9 Pages.

(Continued)

*Primary Examiner* — Jamel E Williams
(74) *Attorney, Agent, or Firm* — Lee & Hayes, P.C.

(57) ABSTRACT

A plug is adapted for connection to an ultrasonic transducer to protect and guide wiring during storage, transportation, and the manufacturing process. The plug protects and orients wires to allow for automated manufacturing and to provide an improved connection between the transducer and an electronic printed circuit board. The plug may include a first portion having wire guide(s) and a second portion configured for attachment to the transducer. The plug includes at least one wire guide to protect wire(s) that connect the ultrasonic transducer to a printed circuit board. A wire extends through a passage defined in each wire guide on a first portion of the plug. The first portion slides with respect to the second portion to expose portions of first and second wires carried within the first and second channels, respectively. Once exposed, the wires can be soldered to a PCB in an automated manner.

20 Claims, 17 Drawing Sheets

(51) Int. Cl.
  *G01F 15/14* (2006.01)
  *H04R 1/02* (2006.01)
  *G01N 29/22* (2006.01)
  *G01N 29/24* (2006.01)

(52) U.S. Cl.
  CPC ............ *G01N 29/227* (2013.01); *H04R 1/02* (2013.01); *G01N 29/223* (2013.01); *G01N 29/2437* (2013.01)

(56) References Cited

U.S. PATENT DOCUMENTS

| | | |
|---|---|---|
| 2006/0150817 A1 | 7/2006 | DeGuiseppi et al. |
| 2008/0276724 A1* | 11/2008 | Straub, Jr ............... G01F 1/667 73/861.18 |
| 2009/0173167 A1 | 7/2009 | Takayanagi |
| 2012/0234181 A1 | 9/2012 | Etter et al. |
| 2015/0082880 A1 | 3/2015 | Alien |
| 2015/0377668 A1 | 12/2015 | Nielsen |
| 2018/0227507 A1 | 8/2018 | Siminoff et al. |
| 2018/0313754 A1 | 11/2018 | Cappo et al. |
| 2019/0008580 A1 | 1/2019 | Fischell et al. |
| 2019/0346299 A1 | 11/2019 | Fang et al. |
| 2020/0103262 A1 | 4/2020 | Straub, Jr. et al. |
| 2020/0300679 A1 | 9/2020 | Kroemer |
| 2021/0003428 A1* | 1/2021 | Sabraoui ................. H04R 1/02 |
| 2021/0003434 A1* | 1/2021 | Sabraoui ................. G01F 15/14 |
| 2021/0006875 A1* | 1/2021 | Sabraoui ................. G01F 1/662 |

FOREIGN PATENT DOCUMENTS

| | | | | |
|---|---|---|---|---|
| EP | 3760321 A1 * | 1/2021 | ........... | G01D 11/245 |
| EP | 3760982 A1 * | 1/2021 | ........... | G01D 11/245 |
| JP | 2016008880 | 1/2016 | | |

OTHER PUBLICATIONS

Extended European Search Report dated Nov. 13, 2020 for European Patent Application No. 20183829.9, 9 pages.
Extended European Search Report dated Nov. 9, 2020 for European Patent Application No. 20183819.0, 7 pages.
Kim et al, "Ultrasonic wave propagation in carbon fibre-reinforced plastics", Journal of Material Science, vol. 22, No. 12, Dec. 1, 1987, pp. 4536-4540.
Office Action for U.S. Appl. No. 16/588,844, dated Mar. 25, 2021, Sabraoui, "Transducer Enclosure with Variable Moisture Proofing", 8 Pages.

* cited by examiner

TRANSDUCER ENCLOSURE TO PROTECT AND POSITION TRANSDUCER WIRING

RELATED APPLICATIONS

This patent application claims benefit of priority to U.S. patent application Ser. No. 62/869,988, titled "Ultrasonic Transducer", filed on 2 Jul. 2019, which is incorporated herein by reference.

BACKGROUND

Utility meters (e.g., water and gas meters) may include ultrasonic transducers and other components. The design requirements for such meters include issues of quality, accuracy, power consumption, and cost. In a first example, improved techniques for manufacturing and assembly of a transducer and a printed circuit board (PCB) of the utility meter would increase quality and reduce costs.

In a second example, storage and transport periods of the transducer lifecycle may include relative humidity 50 to 100 percent. However, in an operating environment, it is common small amounts of water to leak into the enclosure of a transducer, and for the use of desiccant to reduce the humidity levels to 10 percent or less. Accordingly, an enclosure of a transducer that is more compatible with such variances in relative humidity during different periods of the lifecycle would be advantageous.

In a third example, known enclosures for transducers have failed to conduct ultrasonic signals with low losses and consistency and/or failed to provide the needed structural strength. Accordingly, improved techniques would result in increased signal strength and signal consistency, as well as greater physical strength and resistance to pressure.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 1 is a diagram showing an example of a lifecycle of a metering device, transducer assembly and/or transducer device within such an assembly, and particularly showing how relative humidity varies over the lifecycle.

FIG. 2 is a view of an example ultrasonic transducer assembly in a high humidity environment, particularly showing a sealed and waterproof configuration to resist the humidity.

FIG. 3 is a view of portions of an ultrasonic transducer assembly showing example structures configured to adapt and/or transition the transducer from a high humidity environment to a low humidity environment.

FIG. 4 is an example transducer assembly shown in cross-section.

FIG. 5 is a further view of portions of the transducer assembly, showing the epoxy resin and a channel to allow humidity transfer.

FIG. 6 is a cross section, showing an example arrangement of a transducer assembly, including a piezo device and a channel to transfer humidity.

FIG. 7 is a view of an example enclosure of an transducer assembly with a closed channel, suitable for shipping, storage and pre-installation situations.

FIG. 8 is a view of an example enclosure for an ultrasonic transducer assembly transitioning from a closed channel to an open channel.

FIG. 9 is a view of an example ultrasonic transducer assembly with an open channel, suitable for operational situations.

FIG. 10 is a cross-sectional view of an example transducer assembly in an operational configuration with the channel opened.

FIG. 11 is a cross-sectional view of a utility meter having two installed transducer assemblies, both configured with open channels consistent with operation of the utility meter.

FIGS. 12 through 22 show example transducer assemblies, including ultrasonic sensor devices and associated enclosures, configured for automated assembly with a printed circuit board and/or other components within a utility meter.

FIG. 12 is a view of an example transducer assembly having an enclosure with a two-portion plug connected to an upper portion of the enclosure.

FIG. 13 is a cross-sectional view of an example transducer assembly and an associated two-portion plug.

FIGS. 14 through 19 show an example sequence of actions or steps used in a method to install a metering device, including installation of a transducer on a water or gas pipe and soldering of wiring of the transducer to electrical contacts of a PCB.

FIG. 23 is a cross-sectional diagram of an ultrasonic transducer assembly having a piezo transducer within a plastic enclosure that contains zero percent glass fiber.

FIG. 24 is a cross-sectional diagram of an ultrasonic transducer assembly having a piezo transducer within a plastic enclosure that is 40% glass fiber.

FIG. 25 is a cross-sectional view of a first example of an ultrasonic transducer assembly having a piezo transducer within a bi-material plastic enclosure, having portions that are made of materials having different characteristics and/or compositions.

FIG. 26 is a cross-sectional view of a second example of an ultrasonic transducer assembly having a piezo transducer within a bi-material plastic enclosure, having portions that are made of materials having different characteristics and/or compositions.

DETAILED DESCRIPTION

Overview

Figure 1:
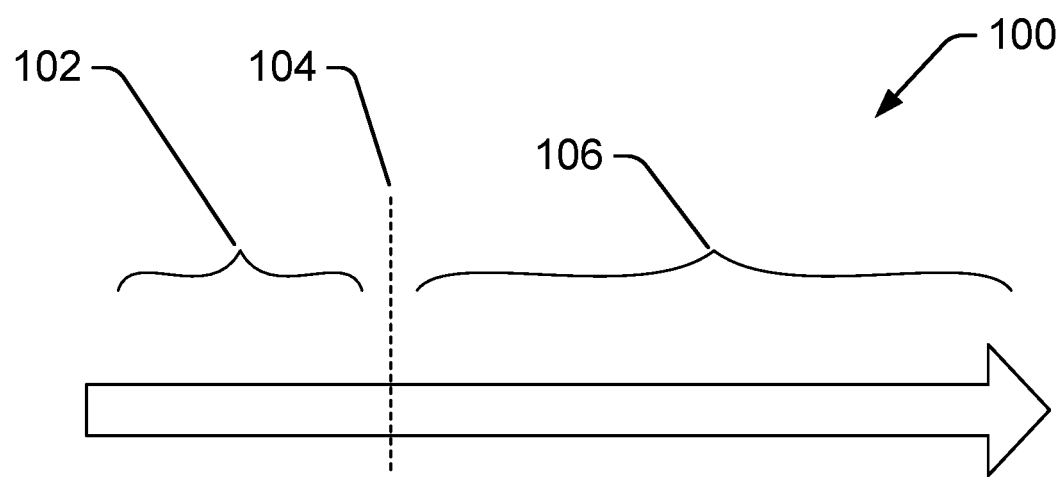
FIGS. 1 through 11 show example transducer assemblies that may be converted from a moisture-proof state suitable for storage and/or transport to an operational state that allows a desiccant to remove moisture.

In a first example, the disclosure describes techniques for providing an ultrasonic transducer (usable in some examples in a water meter, gas meter, or other device) having features and techniques for maintaining the transducer in a waterproof state and a non-waterproof state. After manufacture (e.g., during storage and transportation), ambient relative humidity can vary widely, and may reach levels that are too high. Such humidity may degrade electronic components such as an ultrasonic transducer (e.g., a piezo device). In some cases, the high humidity may damage the glue that couples the piezo device to the housing. Accordingly, example features and techniques hold the transducer in a waterproof state during these times. Upon installation in a water meter or other device, the transducer is transitioned to a non-waterproof state, to thereby allow water to be exhausted from the transducer. In operation of a water-metering device, water may enter the transducer in small quantities. A desiccant may be used to lower the humidity in the environment of the transducer. Because the transducer is in the non-waterproof state, any small quantities of water that entered the transducer are removed from the transducer and absorbed by the desiccant. In an example, a tube may provide a channel within the transducer. At one end of the channel is an area near the piezo device and associated glue attaching it to the housing and/or enclosure. At the other end of the channel, an end of the tube protrudes from the enclosure of the transducer. In the example, a frangible end of the tube can be broken off. Prior to breaking the end of the tube, the transducer is in the waterproof state, and the internal components such as the piezo device and glue attaching it to the enclosure are protected from humidity. The state is considered waterproof at least in part because the environmental conditions during storage and transportation are not nearly as wet as they are in the operational mode, and the transducer is essentially waterproof. After breaking off the end of the tube, the transducer is in the non-waterproof state. In an operative state, some water may enter the transducer's enclosure. Accordingly, by transitioning to the non-waterproof state, water can be removed. Thus, any moisture entering the transducer, such as from condensation on a pipe to which the transducer is attached, may exit through the open end of the tube, where the moisture is absorbed by the desiccant. Accordingly, before and after installation and operation, the piezo unit, glue and other transducer components are held and maintained in a sufficiently low humidity environment.

In a second example, the disclosure describes techniques for providing a plug to protect and guide wiring during storage, transportation, and the manufacturing process. The techniques provide for an improved connection between the transducer and an electronic printed circuit board (PCB) and allow for a fully automated manufacturing process. In the example, a plastic plug is configured for insertion into an enclosure of a transducer. Two wires (e.g., electrical cables) extend through passages defined in two wire guides on an upper portion of the plug. In an example, an assembly process attaches the wires of the transducer to a PCB.

In a third example, the disclosure describes advantages of a transducer assembly having a bi-material enclosure. In a more specific example, a plastic housing with mechanical reinforcements (e.g., 40% glass fiber) provides the advantage of strength and resistance to a high-pressure environment encountered during use. Transducer assemblies using a plastic sleeve having little or no reinforcing materials may provide less variations in signal transmission between assemblies than such assemblies having reinforcing materials. Removing reinforcing materials from the plastic sleeve obviates concern over variations in fiber content and/or alignment. Removing reinforcing material from the plastic sleeve also obviates concern over the quality of fiber coatings, which may become exposed after wear and create a moisture-entry path. Accordingly, the bi-material transducer enclosure provides resistance to pressure and consistency between transducer assemblies.

Transducer Enclosure with Variable Moisture-Proofing

FIGS. 1 through 11 show examples by which example transducers may be converted from a waterproof state suitable for storage and/or transport to an operational state that allows water molecules to be exhausted through an open tube and to be absorbed by a desiccant to remove moisture from the transducers.

FIG. 1 shows an example of a lifecycle timeline 100 of a transducer for a metering device. The first period 102 in the lifecycle (e.g., zero to eighteen months) the transducer may be subject to high humidity (e.g., 50% to 100% relative humidity). Humidity may damage electronic components, the piezo device, and/or glue attaching the piezo device to a housing or enclosure of the transducer. Accordingly, the transducer must be protected from the humidity, and an enclosure of the transducer must be in a waterproof mode, state and/or condition. After installation at time 104, the transducer and an associated water or gas metering device may have a 15- to 20-year lifespan 106. During the lifespan 106, any humidity entering the enclosure must be exhausted from the enclosure. Water may enter the enclosure of the ultrasonic transducer due to that enclosure's connection and/or proximity to water or gas pipes. Accordingly, an opening in the enclosure is used to exhaust and/or transfer any moisture and humidity from the enclosure. Such water may be transferred to a desiccant within the water or gas meter. This process keeps the humidity within the metering device quite low (e.g., less than 10% relative humidity). Because the transducer must be able to exhaust any humidity to the desiccant, it is in a non-waterproof mode, state and/or condition during the operating period 106.

Figure 2:
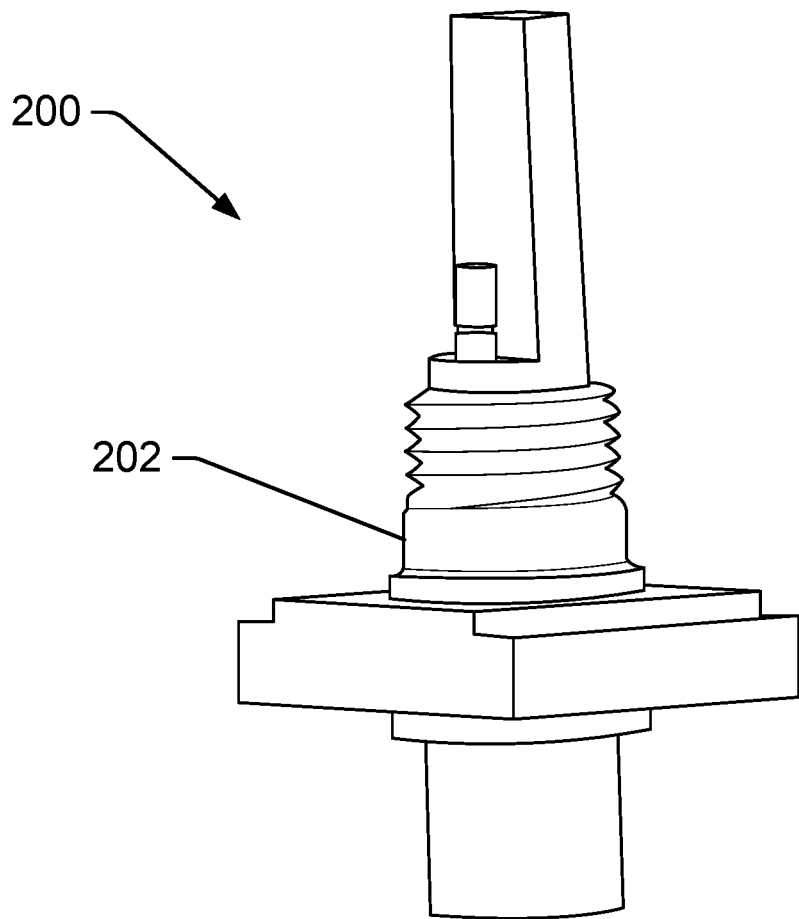

FIG. 2 shows an example transducer assembly 200, having an enclosure 202. Within the enclosure, the transducer assembly 200 may include an ultrasonic sensor (e.g., a piezo device), wiring, glue, layers of epoxy or plastic, backing, a humidity-exhausting tube, etc. The transducer assembly 200 is shown in a waterproof state to protect it from a high humidity environment. The waterproof state obviates the need to pack the transducer in desiccant during the storage, warehousing, transportation and/or inventorying phases of its lifecycle. The waterproof state also reduces failure rates that would accompany the failure of such desiccant during wet environments, poor warehousing techniques, etc.

Figure 3:
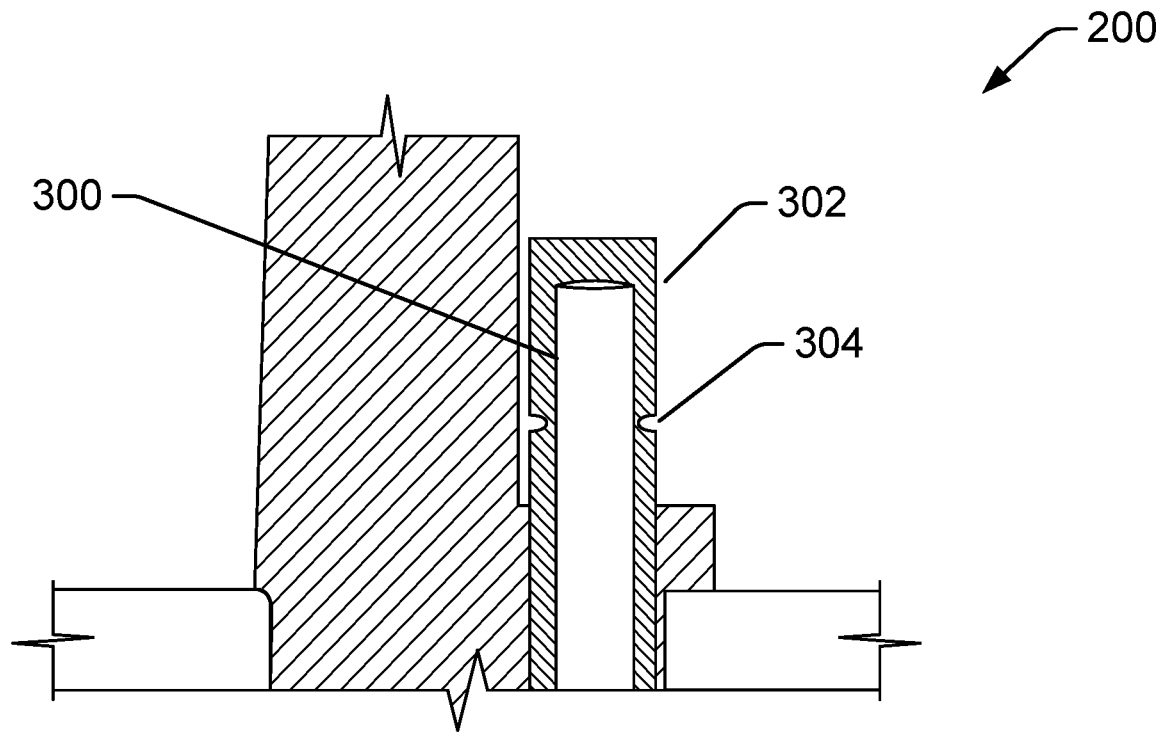

FIG. 3 shows a portion of the transducer assembly 200. In the example shown, a plastic tube 300 connects the internal areas of the transducer assembly (not shown) to the atmosphere outside the enclosure of the transducer (e.g., the interior of the metering device). The tube 300 shows a closed end-cap 302 of the plastic tube 300, which results in a waterproof state or mode of the transducer assembly 200. The waterproof state or more is associated with the storage, transportation and/or warehousing stages of the lifecycle of the transducer, before it is installed on a water pipe and/or in a meter. A thin or frangible region 304 of the tube 300 allows the closed end-cap 302 of the tube to be easily broken off. With the end-cap broken off, an open channel of the tube provides ventilation between an interior of the transducer assembly 200 and atmosphere outside the enclosure portion of the transducer assembly. After the end-cap 302 of the tube is broken off, the transducer assembly 200 is in the non-waterproof state or mode. The non-waterproof state or mode allows water that essentially cannot be stopped from very slowly entering the enclosure of the transducer assembly 200 to be exhausted (through tube 300) at a similar rate, thereby keeping the relative humidity within the enclosure of the transducer assembly at a low level. The non-waterproof state or mode is associated with the 15 to 20-year operational life span of the transducer assembly 200.

Figure 4:
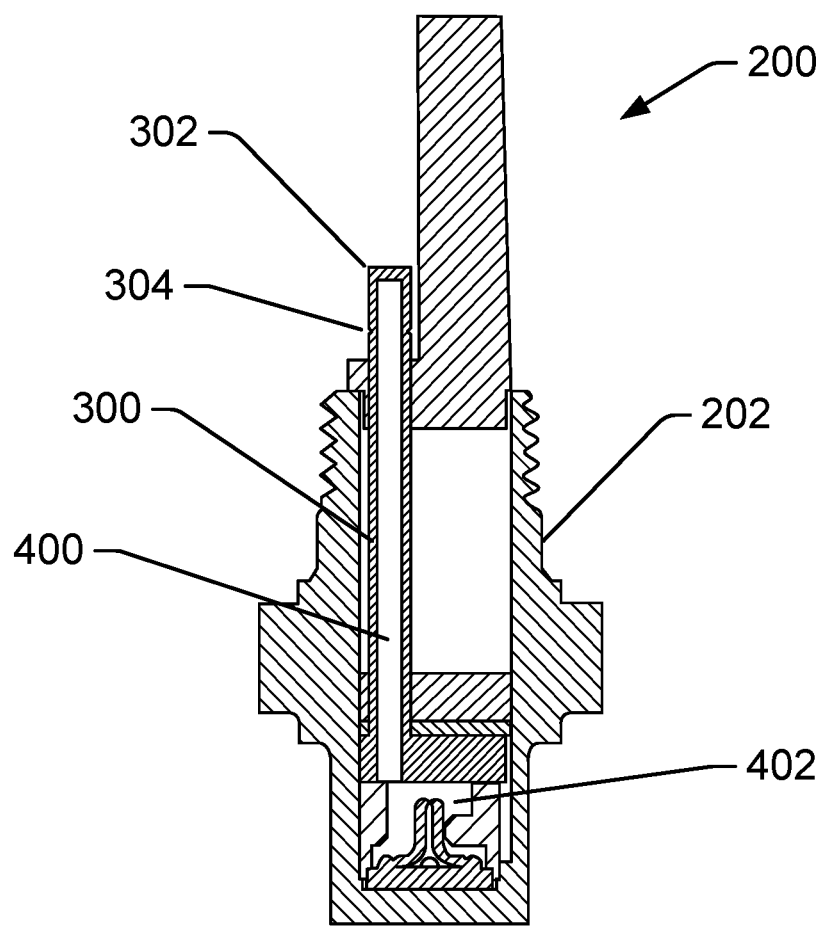

FIG. 4 shows an example transducer assembly 200 in cross-section. The transducer assembly 200 of the transducer is configured to protect an ultrasonic transducer and other components both in storage and after installation in a metering device. The tube 300 defines a channel 400 that provides ventilation (if the open state, with end-cap 302 removed) between the atmosphere and the region 402 within the enclosure 202 of the transducer assembly near the ultrasonic device. The tube 300 has an end-cap 302 which may be broken off at a frangible or weakened location 304. Accordingly, when the endcap 302 is present, the channel 400 of the tube 300 is sealed, and the enclosure is in the waterproof state for warehousing, transportation and/or inventory. When the end-cap 302 is removed, the channel 400 of the tube 300 provides ventilation from the inside of the enclosure 202 to the atmosphere outside the transducer assembly, and the enclosure is in the non-waterproof state or mode. The non-waterproof mode allows small amounts of water that cannot be conveniently stopped from entering the enclosure 202 of the transducer to be exhausted out the channel 400 of the tube 300 and into a desiccant over an approximately 20-year operating lifetime of the transducer.

Figure 5:
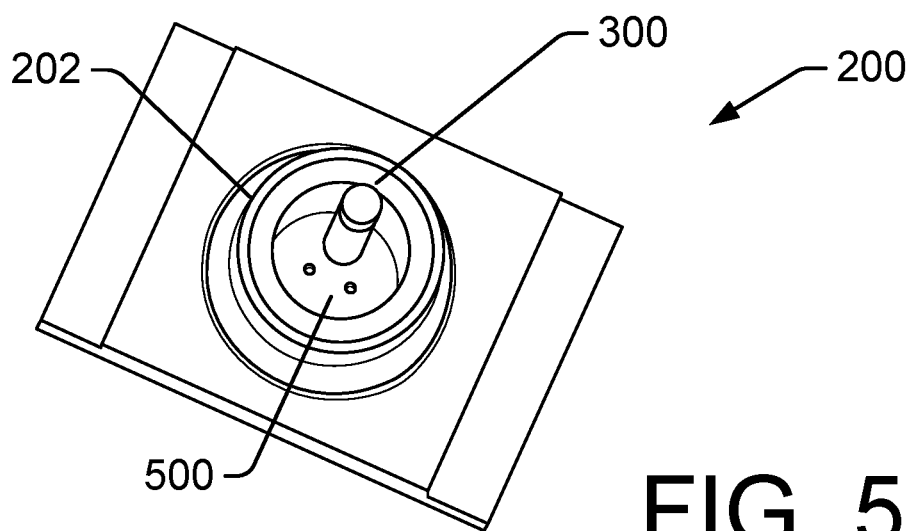

FIG. 5 shows a portion of the enclosure 202 of a transducer assembly 200. In the view shown, the tube 300 of the enclosure 20 of the transducer extends through a layer 500, which provides structural support and water-proofing. In an example, the layer 500 is made of epoxy resin. Accordingly, the tube 300 passing through the resin layer 500 is held in place in a waterproof manner.

Figure 6:
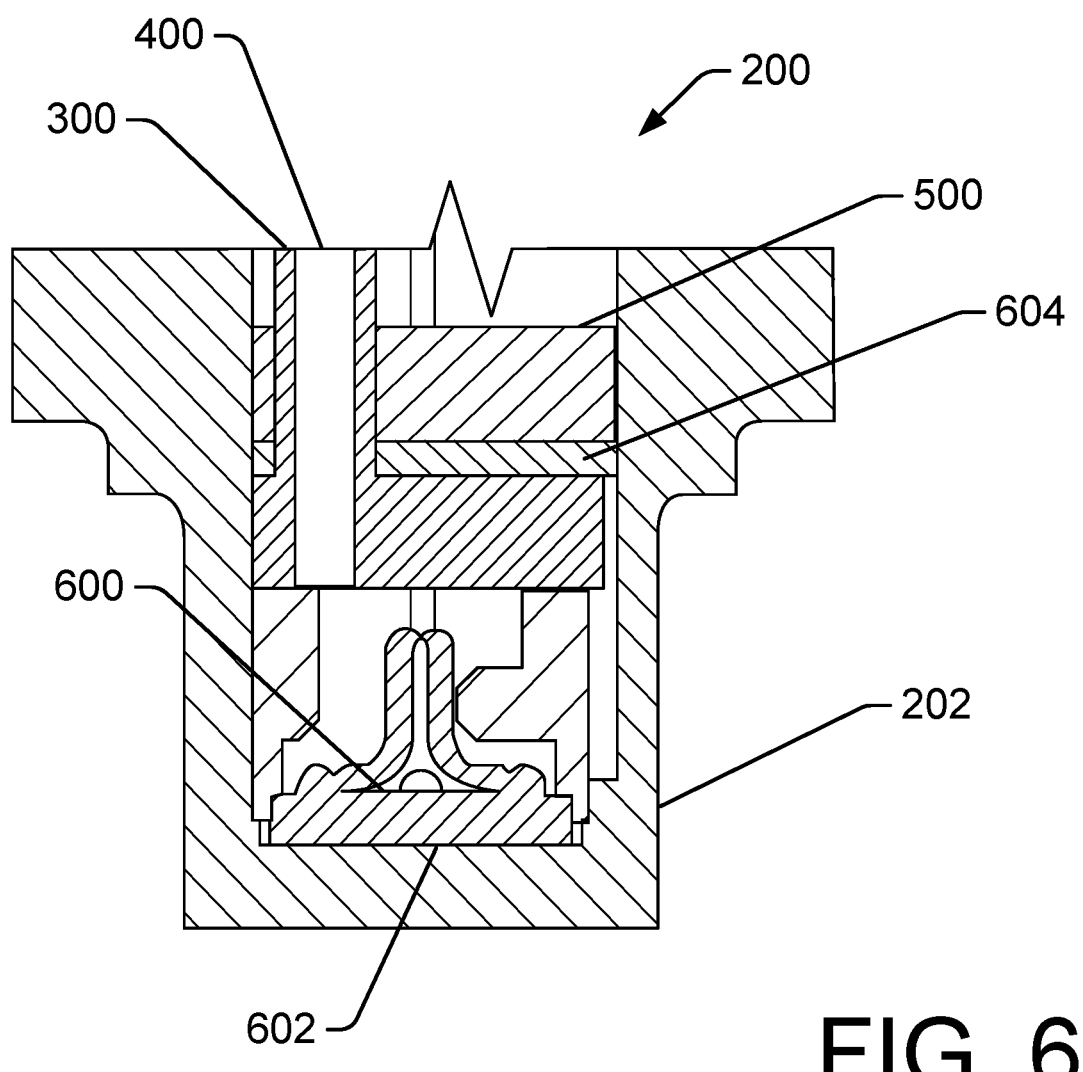

FIG. 6 shows portions of the example enclosure 202 of a transducer assembly 200, and an arrangement of components within the enclosure, including an ultrasonic (e.g., piezo) device 600 and glue 602 sealing the piezo device to a base portion of the enclosure. The channel 400 of the tube 300 is configured to transfer humidity from the area of the piezo device to the atmosphere (if the end-cap has been removed). The view shows a layer of epoxy resin 500 and a layer of silicon glue 604.

Figure 7:
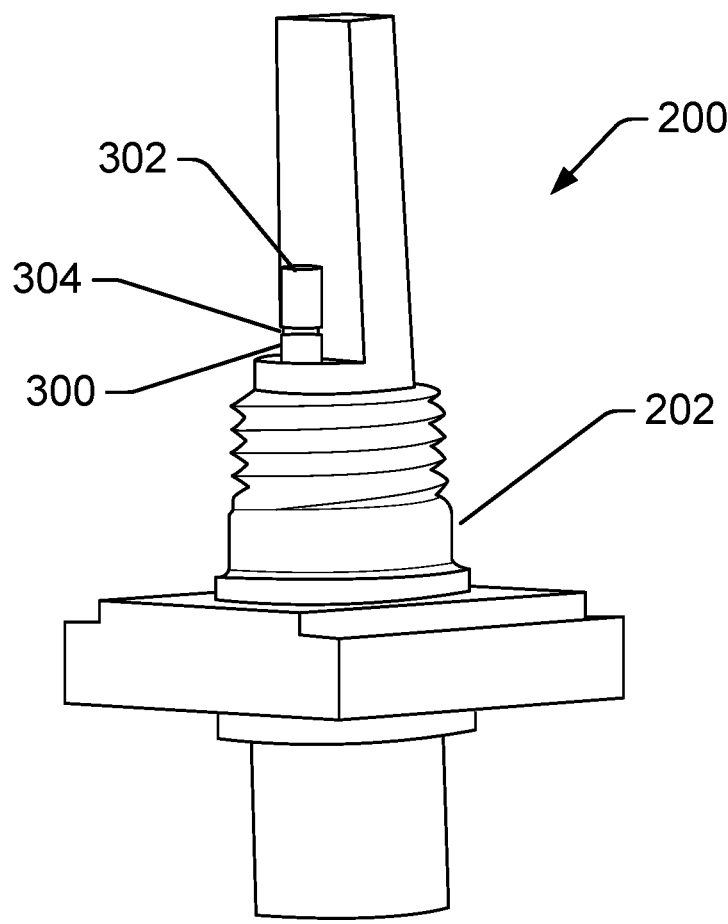

FIG. 7 shows an example enclosure 202 for an ultrasonic transducer assembly 200 with a closed channel, suitable for warehousing, shipping, storage and pre-installation situations. The tube 300 defining a channel is sealed by the end-cap 302. The frangible region 304 has not be broken. Accordingly, the enclosure 202 is in the waterproof condition, phase and/or mode of the transducer lifecycle.

Figure 8:
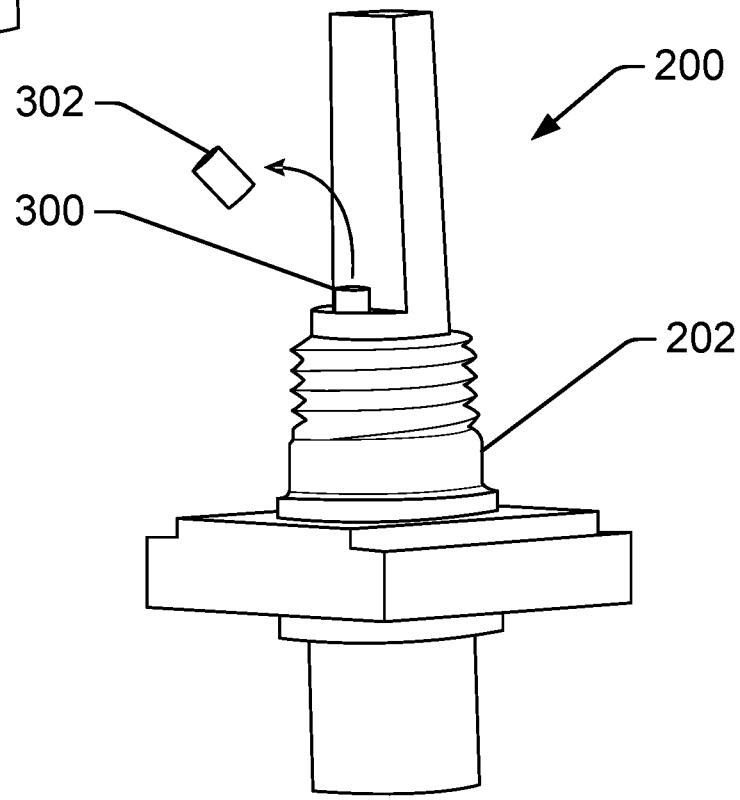

FIG. 8 shows an example process by which the tube 300 and associated internal channel (channel 400, seen in FIG. 4) is opened. The process involves breaking the frangible region 304 (shown in FIG. 7) to thereby remove the end-cap 302. The process transitions the enclosure 202 for a transducer assembly 200 from the waterproof configuration used for shipping, storage and/or pre-installation situations to a non-waterproof configuration used during operation. Because the waterproof condition may not be truly waterproof in an operating environment, the transducer is kept drier by having the tube 300 open, to thereby allow water to be removed from the enclosure 202 of the transducer assembly 200 and absorbed by the desiccant within an enclosure of a metering device.

Figure 9:
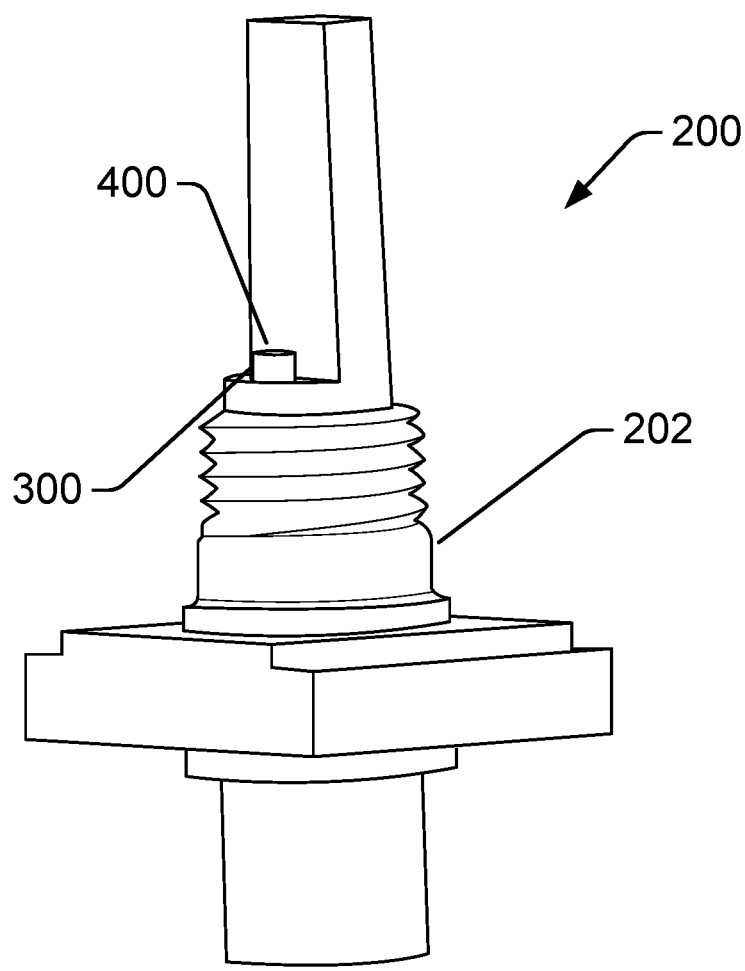

FIG. 9 shows an example enclosure 202 for ultrasonic transducer assembly 200 with an open channel 400 of the tube 300 channel 406, suitable for operational situations. The endcap has been removed and is not shown. The tube 300 is open because the frangible region has been cut or broken during the assembly and/or manufacturing process, thereby releasing the endcap.

Figure 10:
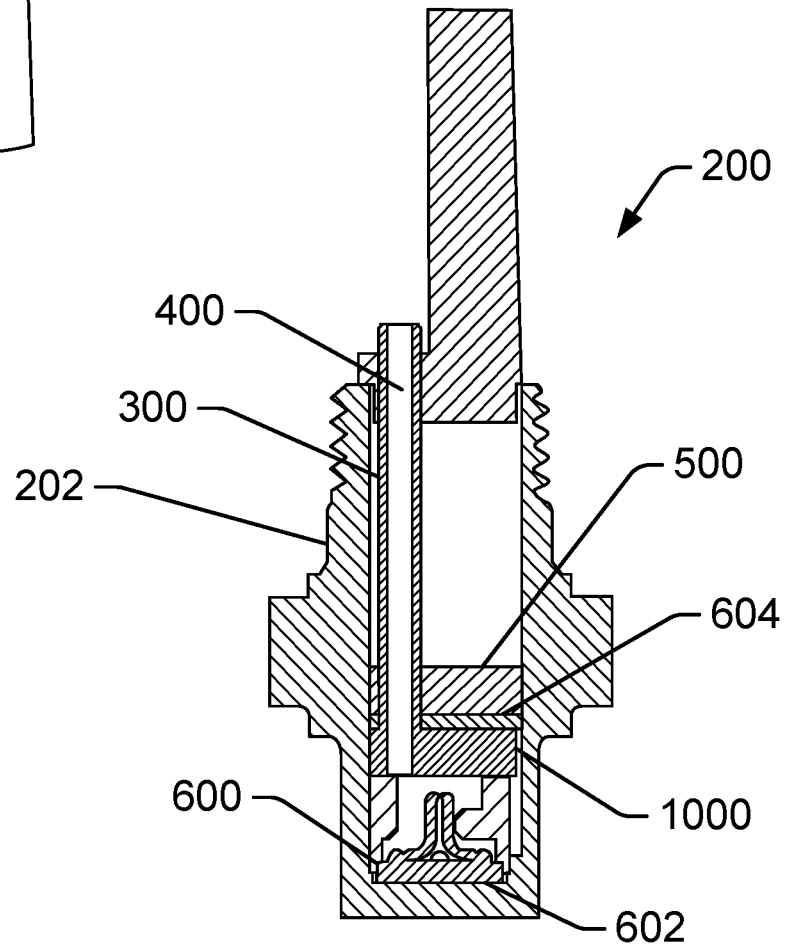

FIG. 10 shows an enclosure 202 for a transducer assembly 200 in an operational configuration with the channel 400 within the tube 300 in an opened condition. In the view shown, the enclosure 202 may enclose, protect and/or support an epoxy resin layer 500, a silicone glue layer 604, and/or other layer(s) 1000. In the example, the piezo device 600 is secured to an inside surface of the enclosure 202 by a layer of glue 602.

Figure 11:
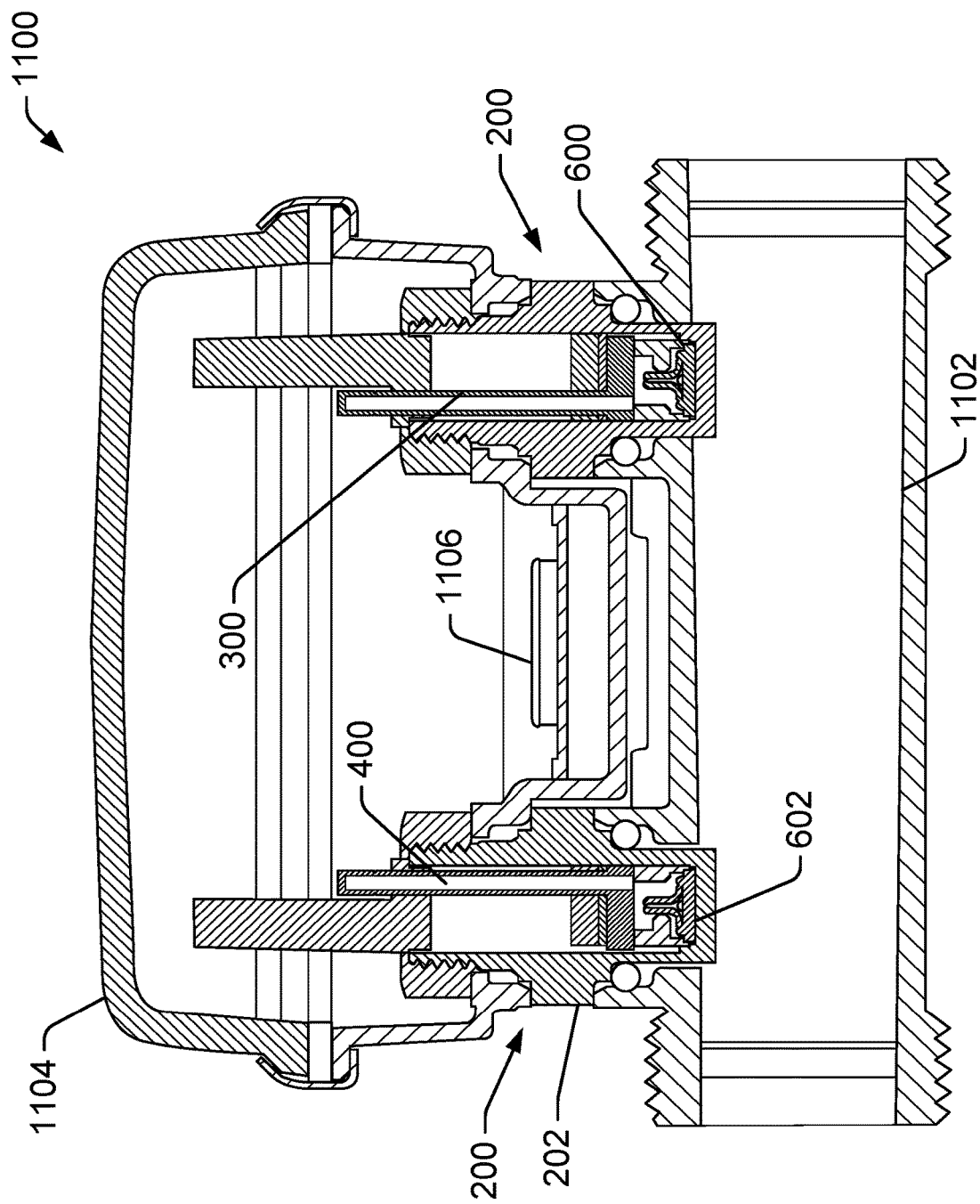

FIG. 11 shows a meter 1100 (e.g., a water meter) having two transducer assemblies 200, including respective piezo or ceramic devices 600. The water meter 1100 is installed on a water pipe 1102 so that the transducer assemblies 200 position the piezo or ceramic devices in a position to receive ultrasonic signals and/or vibrations from the pipe. The transducer assemblies 200 have had their end-caps removed (not shown) so that the open channels 400 of tubes 300 are exposed to the atmosphere of the interior of the enclosure 1104 of the water meter 1100. Accordingly, any water and/or humidity passing through the plastic of the enclosures 202 of the transducer assemblies 200 will be exhausted through the channels 400 of the open tubes 300. Once exhausted, the water will be absorbed by desiccant 1106 within the enclosure 1104 of the water meter 1100. The resultant low humidity environment within the transducer assemblies 200 will protect the glue 602 of holding the piezo devices 600 in place. Accordingly, small amounts of water passing through the plastic of the enclosures 202 of the transducer assemblies 200 is exhausted through tubes 300 and absorbed by desiccant 1106, thereby resulting in a low humidity environment and longer life of the transducer assemblies 200.

Examples for Transducer Enclosure with Variable Moisture-Proofing

FIGS. 1 through 11 show examples of a transducer enclosure with variable moisture proofing. Accordingly, different modes and/or variable moisture proofing may be associated with different respective environments in which a transducer, transducer enclosure and/or metering device is located. In a first example, a transducer assembly includes an enclosure and a transducer located within the enclosure. In the example, a tube defining a channel may connect an interior of the enclosure and an exterior of the enclosure. An end-cap may be disposed on an end of the tube to prevent ventilation and passage of humidity through the channel defined in the tube. A frangible portion allows the end-cap is to be removably coupled to the tube, i.e., the end-cap may be broken off the end of the tube. When the end-cap is installed, it prevents humidity from entering the tube and causing damage to the transducer assembly, such as the glue holding the transducer in place. However, in a very wet environment, such as when the transducer enclosure is attached to a water pipe, water may slowly migrate through the plastic of the enclosure. By breaking off the end-cap of a tube upon installation, such water may be exhausted through the tube, and absorbed by desiccant within a utility meter in which the transducer assembly is located. Accordingly, the environment of the transducer device (e.g., a piezo device) may be keep at a low relative humidity.

In an example, the channel defined in the tube provides sufficient ventilation to remove water entering the enclosure when the enclosure is attached to a waterpipe and when the end-cap is removed at the frangible portion.

In an example, the transducer is a piezo (e.g., piezo electric) device glued to an inside surface of the enclosure.

In an example, the enclosure and the end-cap prevent entrance of water when the transducer assembly is in a storage location.

In an example, transducer assembly may include additionally include layers of waterproof material within the interior of the enclosure to define a chamber within the enclosure. In the example, the transducer may be located within the chamber. In the example, the layers may include a layer of epoxy and a layer of silicone within the enclosure. In the example, the tube passes through the layer of epoxy and a layer of silicone.

In an example, the enclosure is sufficiently waterproof to prevent entry of water in storage and transfer of the transducer assembly. However, the enclosure may be insufficiently waterproof to prevent entry of water when the enclosure of the transducer assembly is attached to a waterpipe. Accordingly, buy removing the end-cap, any water that enters the transducer assembly is exhausted through the tube and absorbed by desiccant.

In an example, the transducer assembly may be located within an enclosure of a water meter. The enclosure of the water meter may also include a desiccant located outside the enclosure of the transducer and inside the enclosure of the water meter.

In a second example, a transducer assembly may include an enclosure and a transducer located within the enclosure. In the example a tube may define a channel connecting an interior of the enclosure and an exterior of the enclosure. The channel may be defined in the tube to provide enough ventilation to remove water entering the enclosure when the transducer assembly is attached to a waterpipe.

In the example, the transducer assembly may be part of a water meter. The combined system may also include an enclosure of the water meter within which the transducer assembly is disposed, and a desiccant located outside the enclosure of the transducer assembly and inside the enclosure of the water meter.

In the example, the transducer assembly may be part of a water meter. Within the combined system, the transducer assembly may be a first transducer assembly. In the example, the water meter may include an enclosure of the water meter within which the first transducer assembly is disposed. The second transducer assembly may also be disposed within the enclosure of the water meter.

In the example, the transducer assembly may be part of a water meter. Within the combined system, an enclosure of the water meter may contain the transducer assembly. In an example, the tube provides ventilation between the interior of the enclosure of the transducer assembly and an interior of the enclosure of the water meter.

In an example, the transducer of the transducer assembly is a piezo or piezo electric device glued to an inside surface of the enclosure.

In an example, a layer of waterproof material(s) within the interior of the enclosure define a chamber within the enclosure, wherein the transducer is located within the chamber, and wherein the tube passes through the layer.

In an example, a broken frangible region at an end of the tube indicating removal of an end-cap of the tube.

In a third example, operation of a metering device is described. In the example, humidity is prevented from passing through a tube and into an enclosure of a transducer assembly by sealing an end of the tube with an end-cap. In the example, the end-cap is removed from the end of the tube. In the example, the transducer assembly is installed within the metering device. In the example, humidity exhausted from the tube is absorbed using a desiccant.

In an example, removing the end-cap may be performed by manually breaking the end-cap using a frangible region of the tube.

In an example, the transducer assembly may be stored before removing the end-cap. The end-cap will protect the transducer from humidity during the storage period.

In an example, the transducer assembly may be operated after removing the end-cap. During operation, water may enter the transducer enclosure due to a wet operating environment. However, the water will be exhausted through the tube due to removal of the end-cap, and once exhausted, the water will be absorbed by desiccant.

In an example, the transducer assembly may be installed for operation by enclosing the transducer assembly within an enclosure of the metering device and enclosing the desiccant within the enclosure of the metering device.

In an example, the transducer assembly may be installed on a water pipe or a gas pipe and may be part of a water meter or a gas meter.

Transducer Enclosure to Protect and Position Transducer Wiring

FIGS. 12 through 22 show examples of a transducer enclosure to protect and position transducer wiring, such as in an automated manufacturing environment. In an example, a plug is adapted for connection to an enclosure of an ultrasonic transducer to protect, guide, position and/or orient wiring during storage, transportation, and the manufacturing and/or on-site installation process(es). The plug protects and orients wires to allow for automated manufacturing and to provide an improved connection between the transducer and an electronic printed circuit board. The plug may include a first portion having wire guide(s) and a second portion configured for attachment to the enclosure of the transducer. The plug includes at least one wire guide to protect wire(s) that connect the ultrasonic transducer to a printed circuit board. A wire extends through a passage defined in each wire guide in a first portion of the plug. The first portion slides with respect to the second portion to expose portions of first and second wires carried within the first and second channels, respectively. Once exposed, the wires can be soldered to a PCB in an automated manner.

Figure 12:
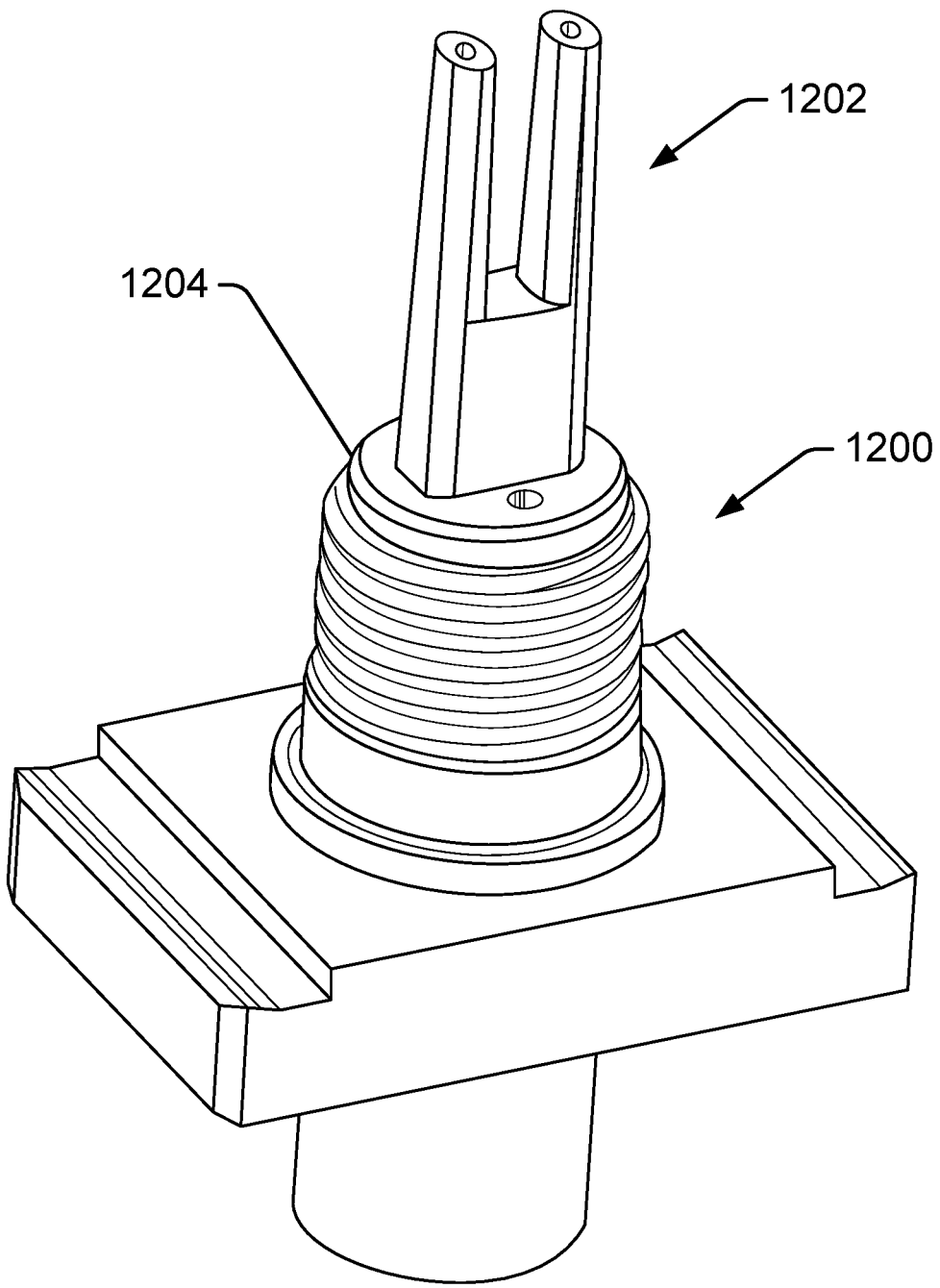

FIG. 12 shows an example transducer assembly 1200, having an enclosure 1204. A wiring guide or plug 1202 is connected to an upper part of the enclosure 1204. In the example, the plug 1202 includes a first portion that provides two wire guides, and a second portion that connects to the enclosure 1204 of the transducer assembly 1200. In a first position, the first portion protects and orients two wires providing a signal from an ultrasonic sensor (e.g., piezo device). Sliding the first portion into a second position within the second portion exposes the wires. The exposed wires may be soldered to a printed circuit board. Accordingly, the enclosure 1204 (for the transducer 1200) and the plastic plug 1202 guide and protect electrical wires, cable and/or wiring guides during storage and transport and may obviate the need for special packaging. Further, when a first portion of the plug is in the second position the wires are exposed, allowing them to be soldered into place.

Figure 13:
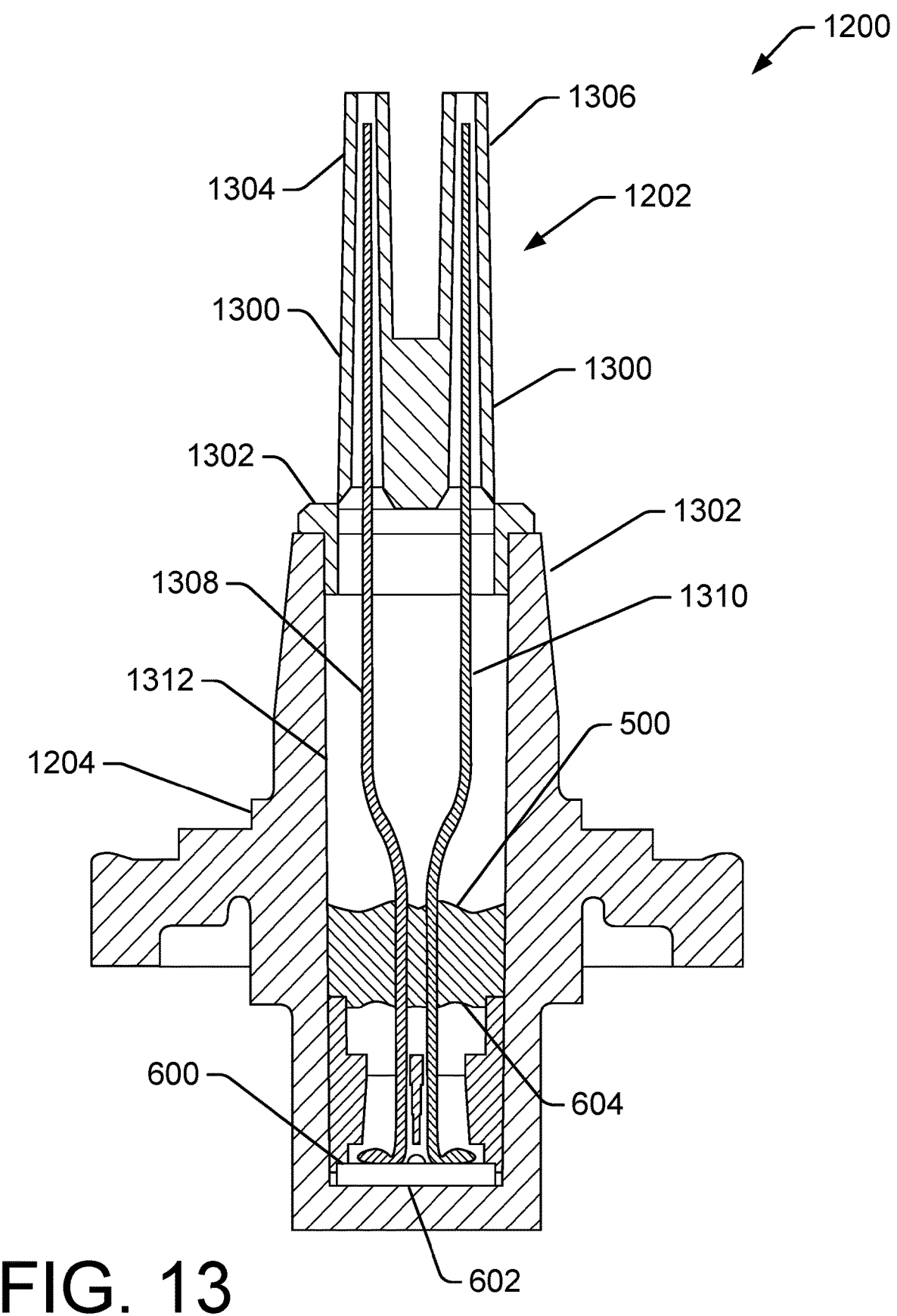

FIG. 13 shows an example enclosure 1204 for a transducer assembly 1200 including a wiring guide or plug 1202 connected to, and/or forming a part of, the enclosure. The plug 1202 may be made of plastic and may include a first portion 1300 that includes one or more wire guides and a second portion 1302 that attaches to the enclosure 1204. In the example shown, the first portion 1300 includes two wire guides 1304, 1306, associated with respective wires 1308, 1310. When the first portion 1300 is in the upper position (as shown) the wires 1308, 1310 are protected by the wire guides 1304, 1306. When the first portion 1300 is moved downwardly with respect to the second portion 1302, i.e., moved into the enclosure body 1312, the wires 1308, 1310 are exposed.

The second portion 1302 may be glued and/or friction-fit into the enclosure for the transducer. Such fastening means avoids twisting the wires 1308, 1310, although some threaded connections could be used.

In the example shown, several components, regions, and/or materials are included within the enclosure 1204 of the transducer assembly 1200. The example shows a layer of epoxy resin 500, a layer of silicone glue 604, an ultrasonic sensor 600, and glue 602 holding the sensor in place.

FIGS. 14 through 19 show an example method used to install a metering device on a pipe, including installation of a transducer in an enclosure on the pipe, and including wiring the transducer to a PCB (which may be contained in a metering device, such as a water or gas meter). The sequence shows example features, structures and techniques of the two-portion plug of the housing of the transducer.

Figure 14:
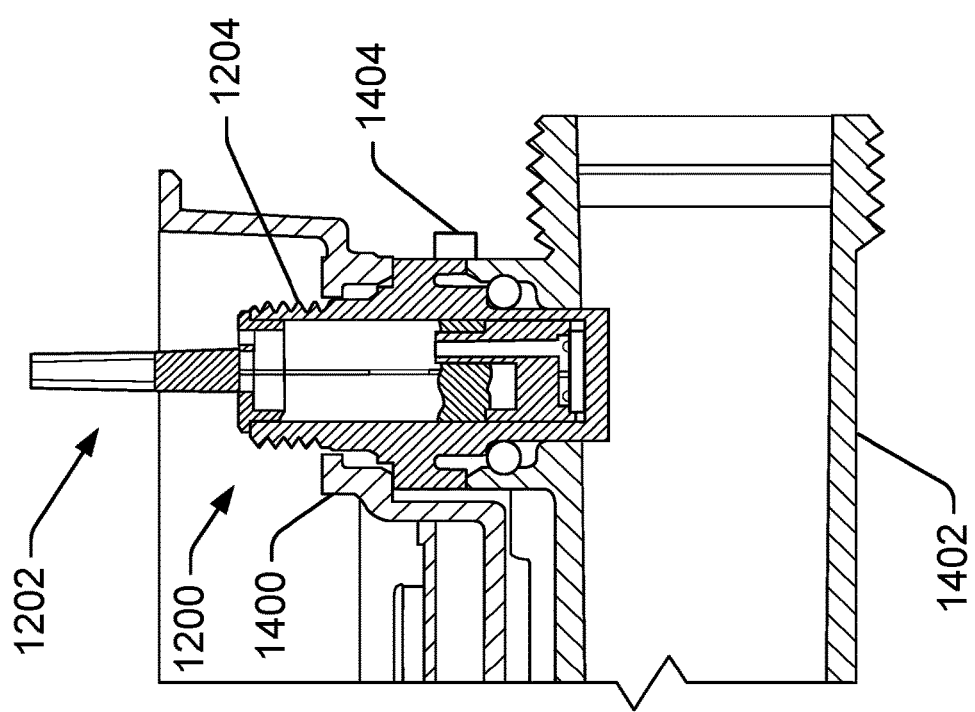

FIG. 14 shows the enclosure 1204 of a transducer assembly 1200 mounted on a pipe 1402. The enclosure 1204 of a transducer assembly may be attached with any fastening means, such as clips or clamps 1404. The wiring guide 1202 (seen edge-on) supports two wires in a pre-determined location. An electronic casing or meter enclosure 1400 is placed on the enclosure 1202 of the transducer assembly 1200. The meter enclosure 1400 may be part of a water or gas meter and may protect and enclose one or more transducer assemblies 1200.

Figure 15:
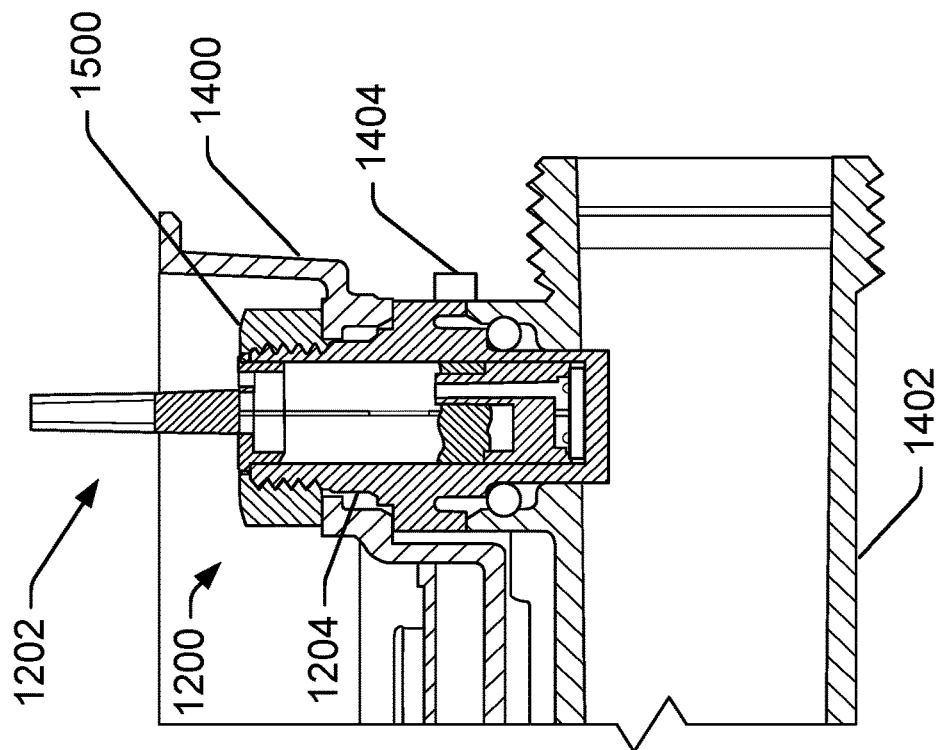

FIG. 15 shows the electronic casing or meter housing 1400 attached to the housing 1204 of the transducer assembly 1200 by a fastener such as a nut 1500.

Figure 16:
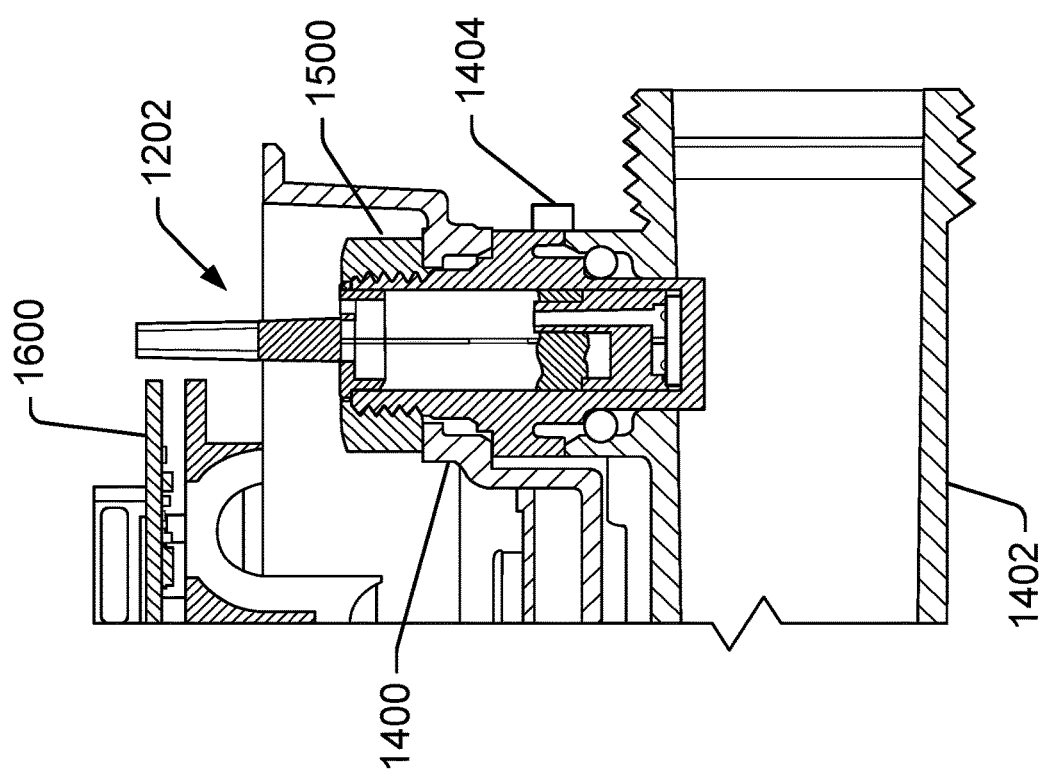

FIG. 16 shows an electronic printed circuit board (PCB) 1600 that has been place on, and attached to, the electronic casing or meter enclosure 1400.

Figure 17:
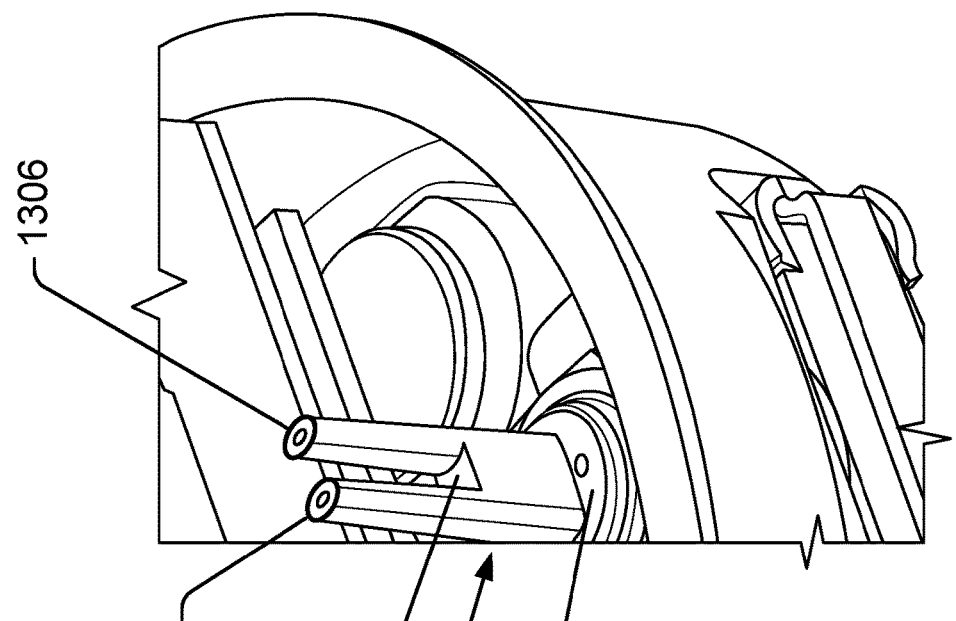
Figure 18:
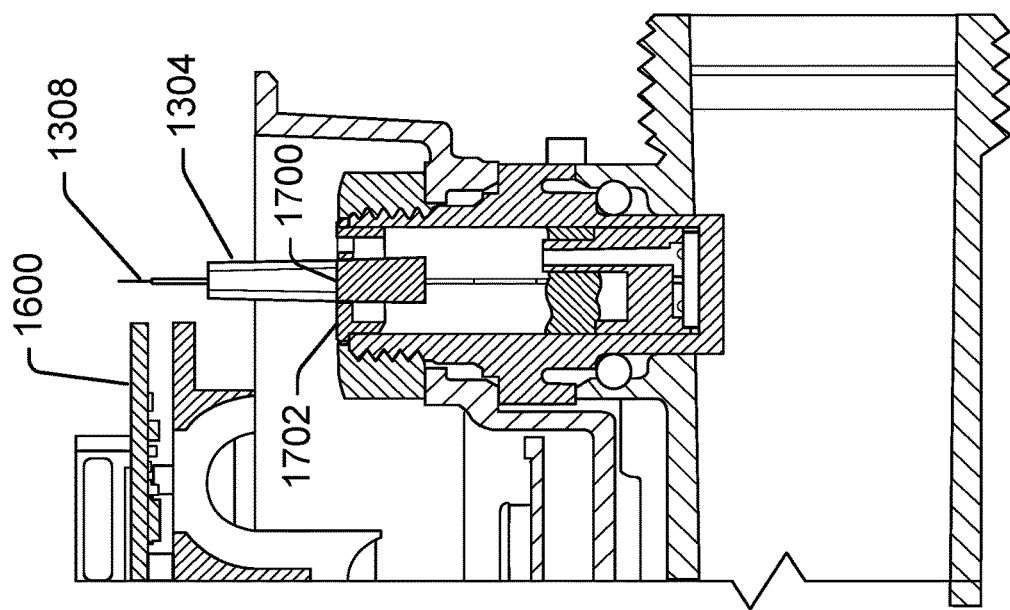

FIG. 17 shows two surfaces 1700, 1702 of the wiring guide or plug 1202. In the assembly process, an automated tool is used to push the upper surface 1700 to the level of the lower surface 1702. This pushes a first or upper portion of the plug to side with respect to a second or lower portion of the plug. While the first portion moves, the wires of the wiring guide do not move, and then become exposed. Accordingly, the movement of the upper surface 1700 lowers the wire guides 1304, 1306, which exposes the wires passing through them (as seen in FIG. 18). The exposed wires are then in position to be soldered to the printed circuit board.

FIG. 18 shows an exposed wire 1308 (and wire 1310, hidden in the view), which was exposed as the wire guide 1304 (and wire guide 1306, hidden in the view) of the wiring guide or plug 1202 moved downwardly, as the wire guide as the surface 1700 was pushed to the level of the surface 1702. Accordingly, the wires 1308 (shown, and wire 1310 directly behind wire 1308) are at a level slightly higher than the PCB 1600.

Figure 19:
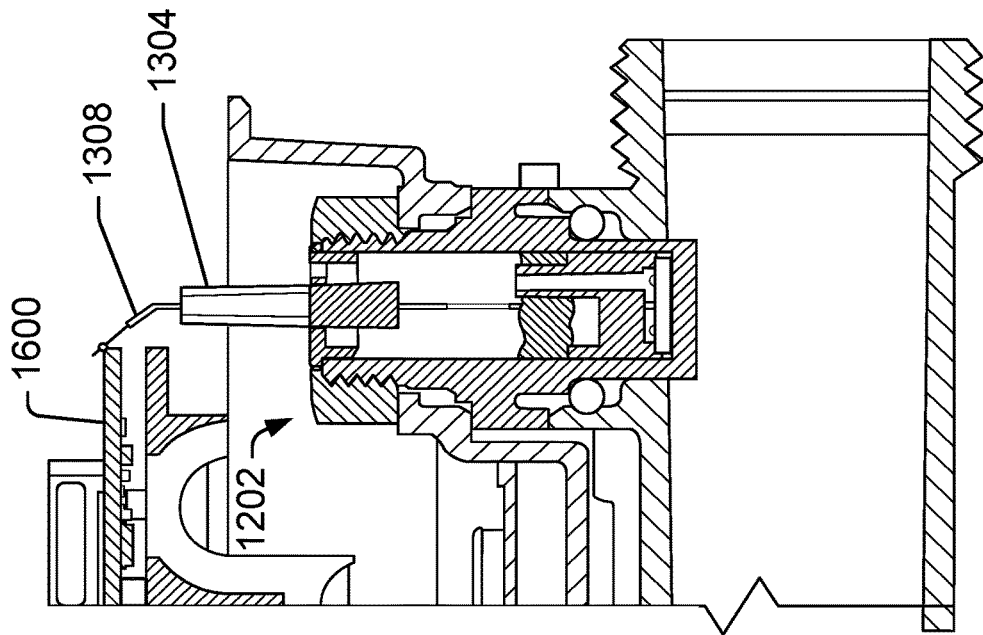

FIG. 19 shows the wire 1308 extending from the wire guide 1304 of the plug 1202. An automated tool (not shown) has pushed the wire 1308 into contact with the PCB. Thus, the wires 1308, 1310 extend just over the top of the PCB 1600, which locates it appropriately to be soldered to the PCB.

Figure 20A:
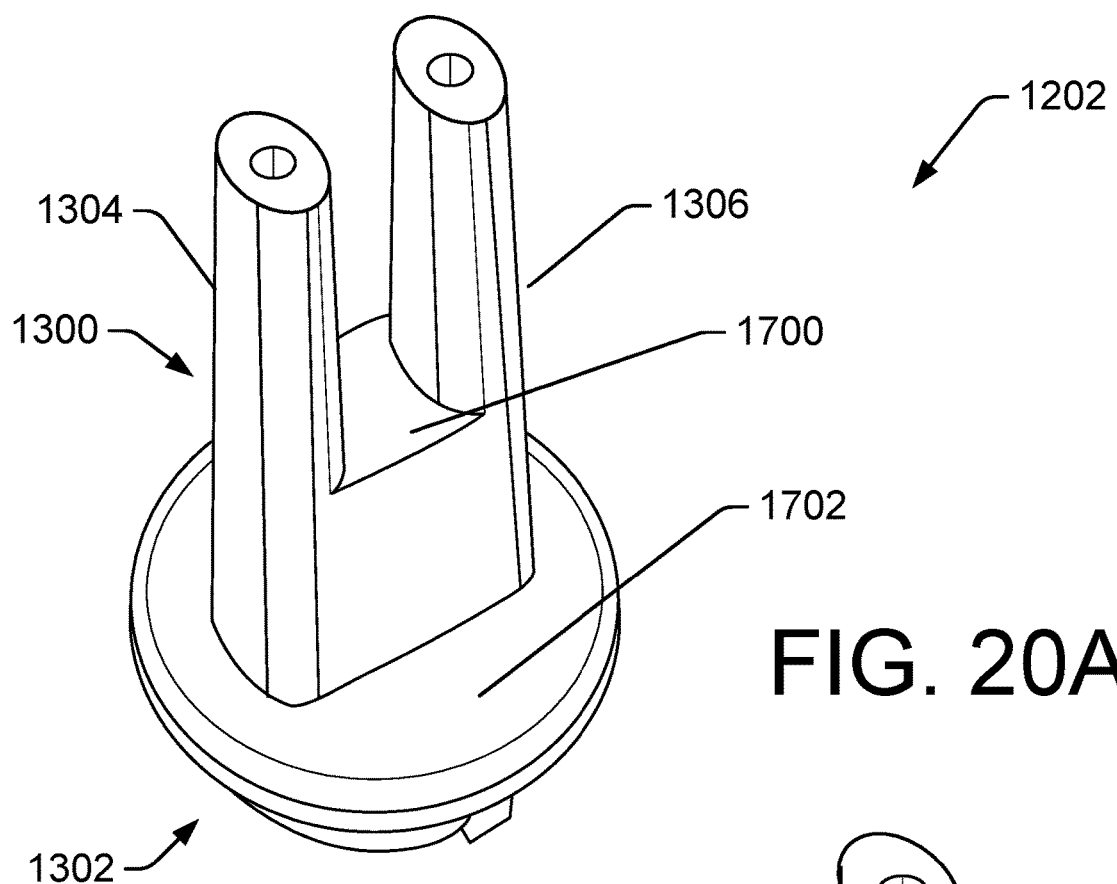
FIG. 20A is a diagram showing a first example plug of an enclosure of a transducer assembly, showing the plug in a configuration appropriate for storage and transport before installation in a metering device.
Figure 20B:
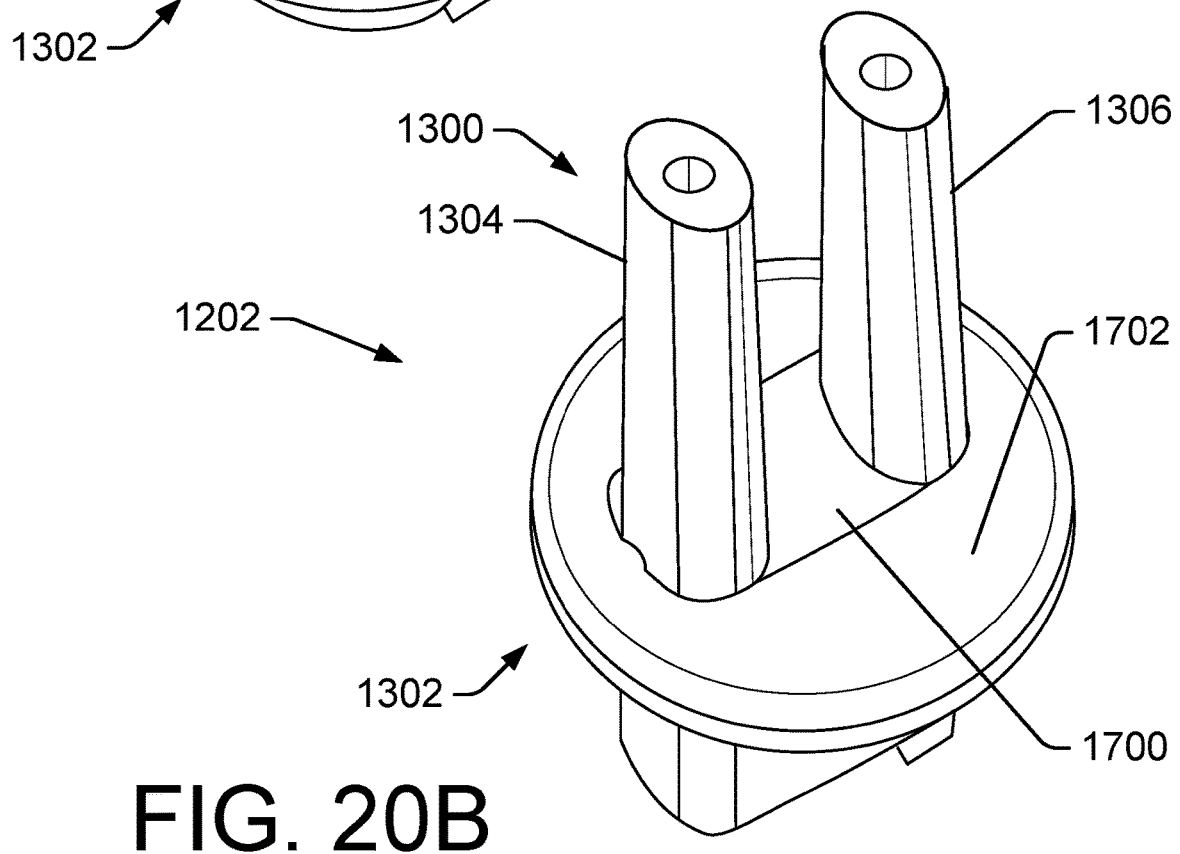
FIG. 20B is a diagram showing the first example plug of the enclosure of the transducer assembly, showing the plug in a configuration after installation in the metering device.

FIGS. 20A and 20B show a first example of a two-part plug or wiring guide 1202. In the view of FIG. 20A, a first portion 1300 of the plug includes two wire guides 1304, 1306 and a second portion 1302 attaches to an enclosure 1204 of a transducer assembly 1200 (both seen in FIG. 12). In the view of FIG. 20A, the first portion 1300 is in an extended position, which covers and protects the wires of the transducer unit. An upper surface 1702 and a lower surface 1704 are at different elevations. When in the upper position (as seen in FIG. 17) the upper surface 1702 may be pushed down to the level of, and flush with, the lower surface 1702 (as seen in FIG. 18). Such movement of the upper portion 1300 will expose two wires 1308 (seen in FIGS. 18 and 19). Accordingly, FIG. 20B shows that part of the upper portion 1300 has been pushed down into the lower portion 1302. The wires are not visible in this view for clarity, but are seen in FIGS. 18 and 19.

Figure 21A:
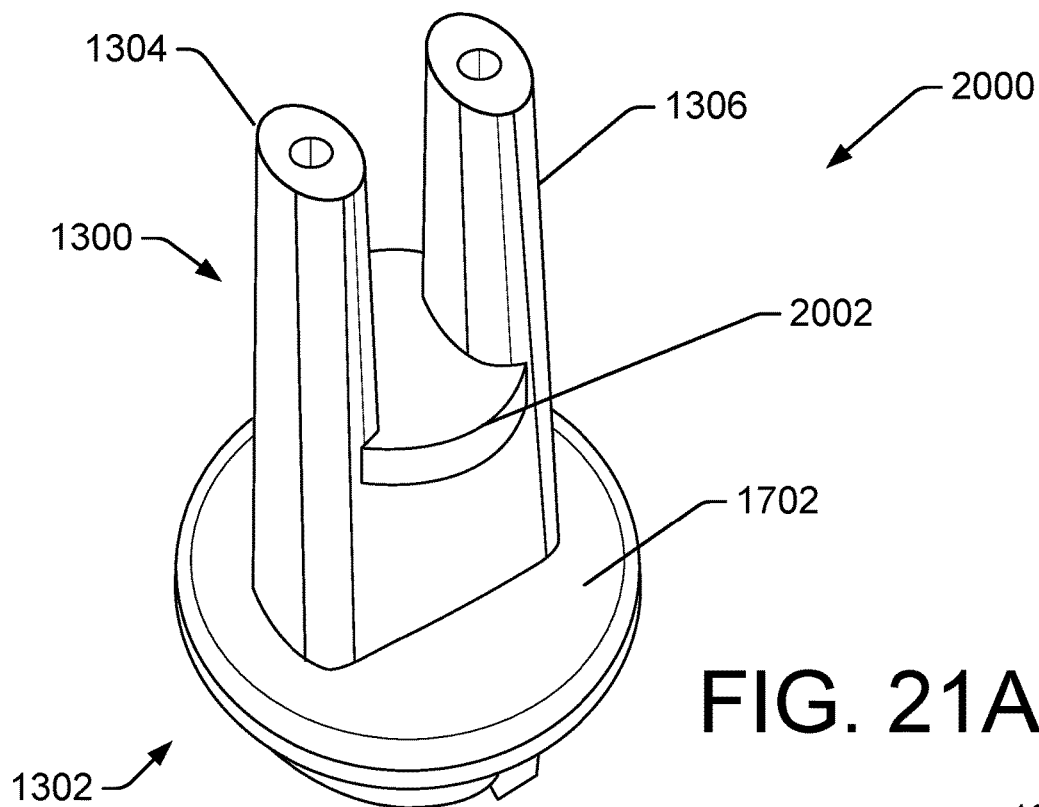
FIG. 21A is a diagram showing a second example plug of an enclosure of a transducer assembly, showing the plug in a configuration appropriate for storage and transport before installation in a metering device.
Figure 21B:
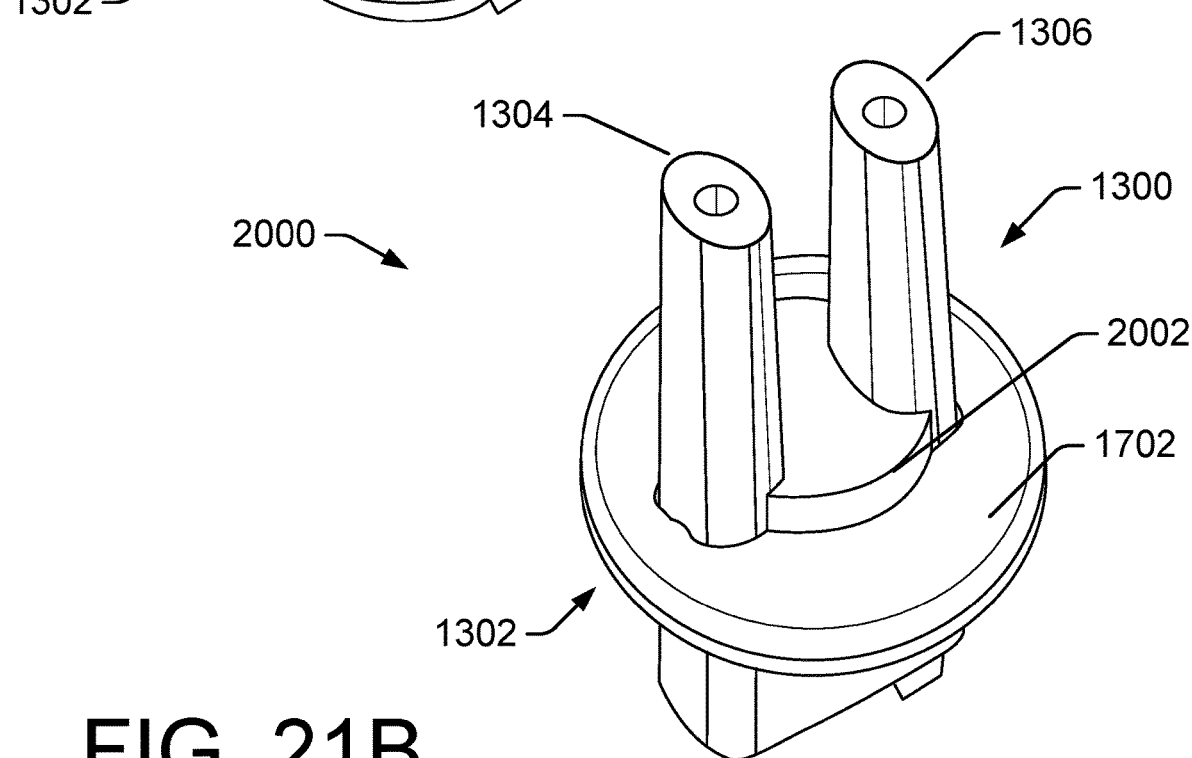
FIG. 21B is a diagram showing the second example plug of the enclosure of the transducer assembly, showing the plug in a configuration after installation in the metering device.

FIGS. 21A and 21B show a second example of a two-part plug or wiring guide 2000. The second example differs from the example of FIG. 20 in that a stop 2002 affirmatively stops motion of the first portion 1300 relative to the second portion 1302. In the view of FIG. 21A, a first portion 1300 of the plug includes two wire guides 1304, 1306 and a second portion 1302 attaches to an enclosure 1204 of a transducer assembly 1200 (both seen in FIG. 12). In the view of FIG. 21A, the first portion 1300 is in an extended position, which covers and protects the wires of the transducer unit. The stop 2002 and a lower surface 1704 are at different elevations. When the upper position the stop 2002 is pushed down to the level of, and flush with, the lower surface 1702. Such movement of the upper portion 1300 will expose wiring of the transducer device. Accordingly, FIG. 21B shows that part of the upper portion 1300 has been pushed down into the lower portion 1302. The wires are not visible in this view for clarity, but are seen in FIGS. 18 and 19.

FIGS. 22A-E show example wiring guides (i.e., plugs insertable into an enclosure of a transducer assembly). In the examples, the wiring guide may include two portions that slide with respect to each other, and which are connected to an enclosure of a transducer assembly. In an example, movement of one portion of the wiring guide results in breakage of a frangible portion of one or both portions of the wiring guide. In an example of the movement, a first surface 1700 of a first portion of the wiring guide is depressed to the level of a second surface 1702 of a second portion of the wiring guide. In an example of the movement, an automated tool pushes on surface 1700, thereby breaking the thin plastic area 2100. The thin plastic area 2100 may be a frangible or breakable seal or perforation. In operation, the surface 1700 and the wire guides are lowered, until the surface 1700 is flush with surface 1702. The lowering of the wire guides breaks the seal or perforation 2100. As the wire guides are lowered, wire in the channels defined by each wire guide is exposed. Accordingly, the wire is covered during storage and transport, but is exposed after movement of the surface 1700 to the level of surface 1702.

Figure 22A:
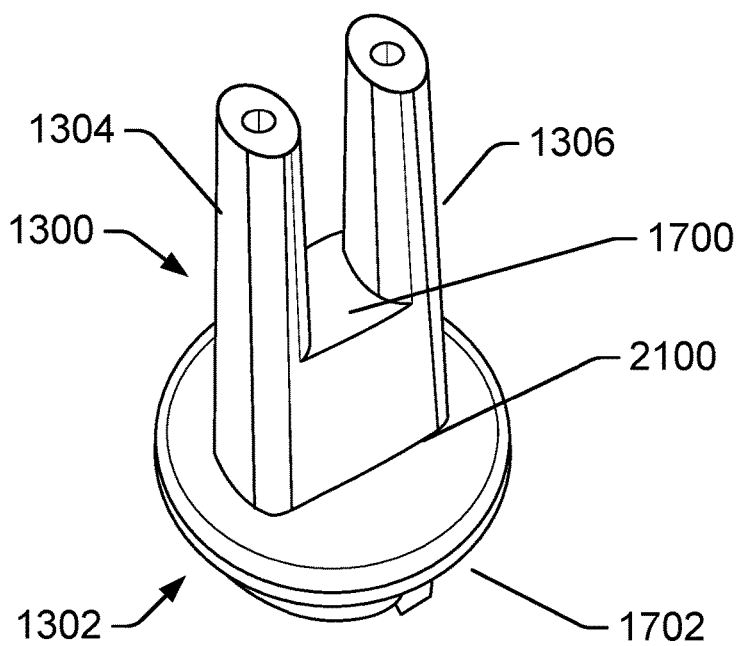
FIG. 22A through E are diagrams showing frangible areas of the plug of an enclosure for a transducer and showing how movement of portions of the plug is performed during assembly of the example plugs at manufacture and/or installation of the transducer assembly in a metering device.
Figure 22B:
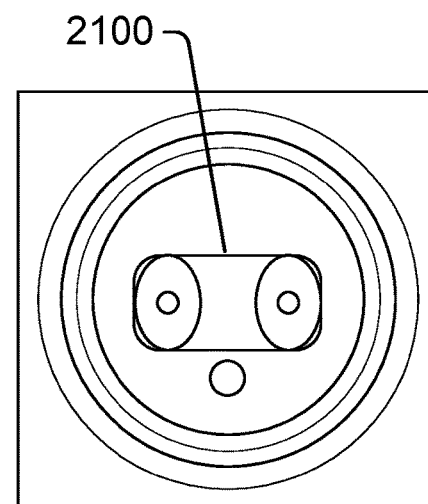
Figure 22C:
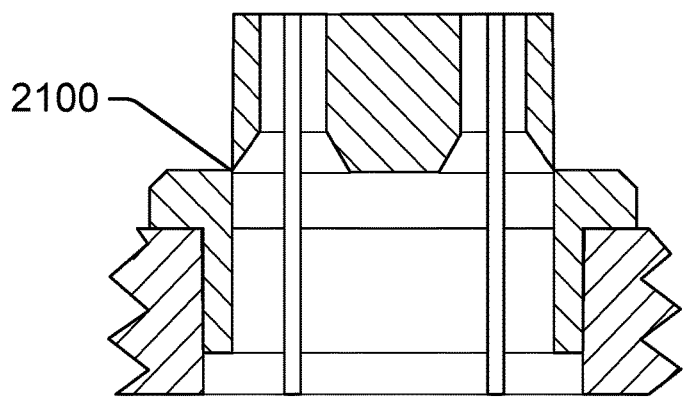
Figure 22D:
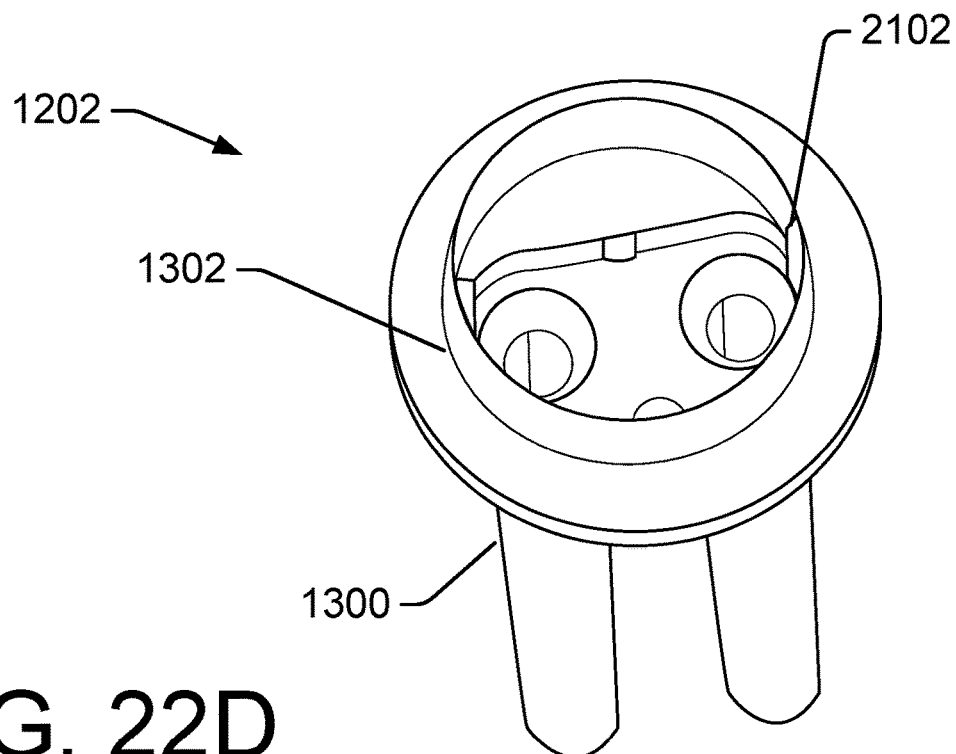
Figure 22E:
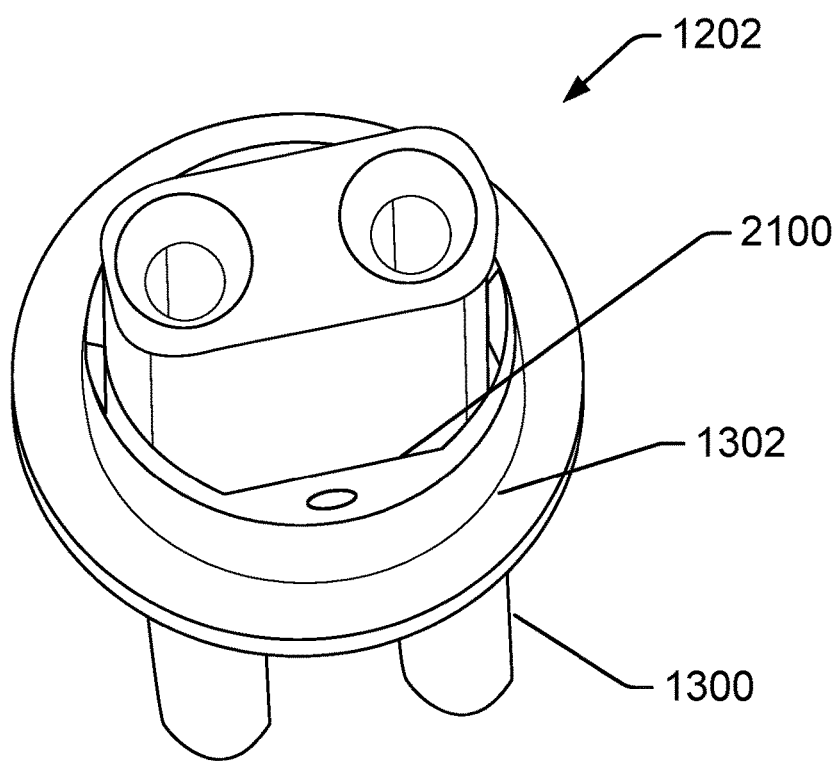

FIGS. 22D and E shows the first and second portions of a wiring guide 1202 in an opposite orientation to that seen in FIG. 22A. A first portion 1300 and a second portion 1302 are friction-fit, so allow the first portion 1300 to slide with respect to the second portion 1302 between first and second positions. In the view of FIG. 22D, the first portion 1302 is in a first position which protects and encloses wiring of the transducer device. In the view of FIG. 22E, the first portion has slid into a second position, which would reveal the wiring (shown in the views of FIGS. 18 and 19).

As seen in FIG. 22D, ribs 2102 may be defined in the plug, to guide and retain a connection between upper and lower parts of the plug or wiring guide. The wiring guide (e.g., plug 1202 of FIG. 13 and plug 2000 of FIG. 21) may have an upper portion including the surface 1700 (seen in FIG. 21) and the two wire guides 1304, 1306 (seen in FIG. 13). Additionally, the wiring guide has a lower portion including the surface 1702 (seen in FIG. 21) and the connecting portion for attachment to the enclosure of the transducer.

Examples of Transducer Enclosure to Protect and Position Transducer Wiring

FIGS. 12 through 22 show examples of a transducer enclosure to protect and position transducer wiring, such as in an automated manufacturing environment. In a first example of a transducer assembly, a transducer includes a first wire and a second wire. A housing may at least partially enclose the transducer. A plug may be disposed in an opening of the housing. An example plug may include a first portion coupled to the opening of the housing and a second portion encircling the first wire and the second wire. In an example, the second portion of the plug is movably coupled to the first portion of the plug, such that the second portion is movable from a first position in which the first wire and the second wire are recessed in the second portion, to a second position in which the first wire and the second wire protrude from the second portion.

In an example, the second portion may include a first wire guide and a second wire guide. The first wire guide and the second wire guide may define a first channel and a second channel, respectively. The first wire and the second wire may be located at least in part within the first channel and the second channel, respectively.

In an example, the first portion may include a first frictional surface and the second portion may include a second frictional surface. In the example, contact between the first frictional surface and second frictional surface resists movement of the second portion with respect to the first portion.

In an example, the first portion may include a first frictional surface and the second portion may include a second frictional surface in contact with the first frictional surface. In the example, movement overcoming friction between the first frictional surface and second frictional surface exposes portions of the first wire and portions of the second wire.

In an example, a first channel and a second channel are defined within the second portion. In the example, when the second portion is in the first position, an end of the first wire and an end of the second wire are enclosed within the first channel and the second channel, respectively.

In an example, a first channel and a second channel are defined within the second portion. In the example, when the second portion is in the second position, an end of the first wire and an end of the second wire extend out of the first channel and the second channel, respectively.

In an example, the transducer assembly may additionally include a circuit board. In the example, when the second portion is in the second position, an end of the first wire and an end of the second wire extend out of a first channel defined in the second portion and a second channel defined in the second channel, respectively. In the example, the wires may extend by a distance sufficient for the first wire and the second wire to contact the circuit board.

In an example, the transducer assembly may additionally include a stop disposed on the second portion to limit relative movement of the second portion with respect to the first portion.

In a second example, a transducer assembly may include a transducer having a first wire and a second wire. In the example, a housing may at least partially enclose the transducer. In the example, a plug may be disposed in an opening of the housing. In the example, the plug may include a first portion coupled to the opening of the housing and a second portion. In the example, the second portion may include a first wire guide and a second wire guide. In the example, the first wire guide and the second wire guide may define a first channel and a second channel, respectively. In the example, portions of the first wire and portions of the second wire may be located at least in part within the first channel and the second channel, respectively.

In an example, the second portion of the plug may be movably coupled to the first portion of the plug between a first position and a second position. In the example, an end of the first wire and an end of the second wire are encased in the first position and exposed when the second position.

In an example, the first portion may include a first frictional surface and the second portion may include a second frictional surface in contact with the first frictional surface.

In an example, the transducer assembly may additionally include a circuit board. In the example, the second portion of the plug may be movably coupled to the first portion of the plug, such as to allow movement between a first position and a second position. In the example, when the second portion is in the second position, an end of the first wire and an end of the second wire extend out of the first channel and the second channel, respectively, by a distance sufficient for the first wire and the second wire to contact the circuit board.

In an example, the transducer assembly may additionally include a stop disposed on the second portion to limit relative movement of the second portion with respect to the first portion.

In an example, the first portion may additionally include a first frictional surface and the second portion may additionally include a second frictional surface. In the example, the first frictional surface and second frictional surface are in contact.

In a third example, a metering device may be manufactured according to one or more actions and/or techniques. In the example, a housing of a transducer may be attached to a pipe. A printed circuit board (PCB) may be attached to an assembly adjacent to the housing. A force may be applied to move a first portion of the housing to expose wires of the metering device. The exposed wires bending the wiring to contact the PCB; and electrically connecting the wiring to the PCB.

In an example, the force applied to move the first portion may include applying force to the first portion until a stop contacts a second portion of the housing.

In an example, the force applied to move the first portion may include applying force to the first portion until a surface of the first portion is substantially planar with a surface of a second portion of the housing.

In an example, the force applied to move the first portion may include applying force to break a seal of the housing.

In an example, the force applied to move the first portion may include sliding the first portion against a second portion of the housing.

In an example, the force applied to move the first portion may include sliding wire guides against wires of the metering device to thereby expose the wires.

Multi-Material Transducer Enclosure

FIGS. 23 through 26 show example designs of transducer assemblies. The designs are made of plastic that includes reinforcing material (e.g., glass fiber) and/or plastic that does not include reinforcing material or includes less reinforcing material. In an example, a bi-material enclosure is configured for use in an acoustic sensor assembly, such as for use in a water or gas metering applications. A plastic housing with mechanical reinforcements (e.g., 40% glass fiber) provides the advantage of strength and resistance to a high-pressure environment encountered during use. Use of a plastic sleeve without fiber reinforcements may result in transducer assemblies with more consistent signal transmission characteristics. In some examples, a less-reinforced plastic sleeve may result in more homogeneous and/or consistent data from different transducer assemblies under the same or similar conditions.

In an example, acoustic signal loss or attenuation may be reduced if a material of the less-reinforced sleeve (e.g., sleeve 2506 and endcap 2508 of FIG. 25) is selected to have an impedance of a piezo device and/or water. Additionally or alternatively, the thickness of the sleeve and/or endcap may be selected to be an odd multiple of a quarter wavelength of an acoustic signal to be measured by a piezo and/or transducer device.

In contrast, use of reinforced material as a sleeve, endcap, and/or other conduit of an acoustic signal may attenuate the acoustic signal because of diffraction, deflection, diffusion, dispersion, etc. The use of reinforcing fibers as the signal conduit may result in variations of fiber content, variations in fiber alignment, and/or failure of a fiber coating to cohesively contain the fibers and/or to provide an entry path for gas, water or other fluid along the fibers. Such entry points may be exposed by, and/or result from, wear during use.

Accordingly, the bi-material transducer enclosure provides a high resistance to pressure, less acoustic signal attenuation, and/or high reproducibility of signal-transmission characteristics between transducer assemblies operating under similar conditions.

Figure 23:
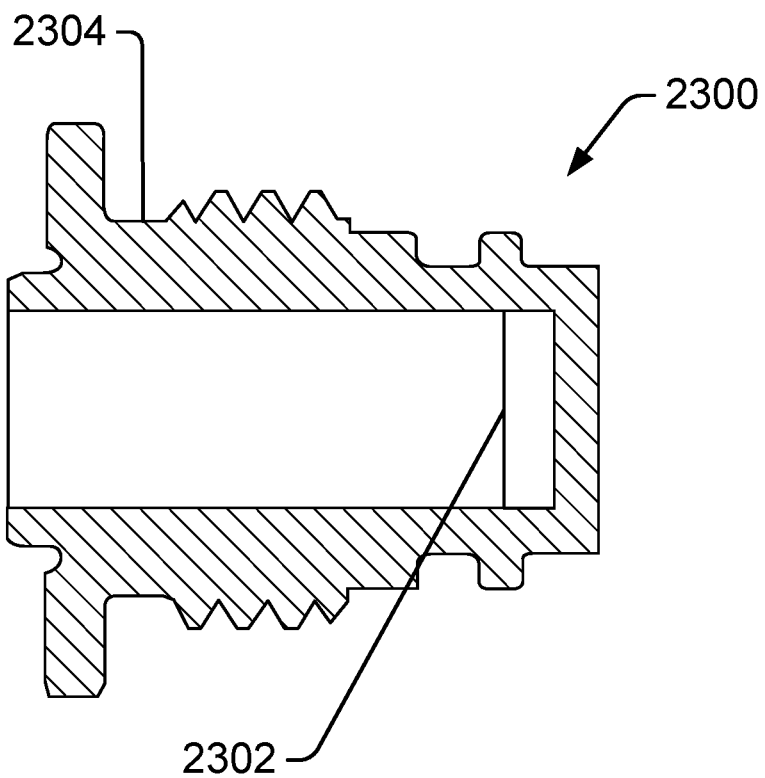
FIGS. 23 through 26 show example designs of ultrasonic transducer assemblies, including enclosures/housings and ultrasonic transducer devices.

FIG. 23 shows an example sensor unit or transducer assembly 2300 including a transducer device 2302. In the example, a piezo device 2302 is shown within the housing 2304. In the example, the housing 2304 of the transducer is made of a plastic that is zero percent (or alternatively, 0% to 15%) glass fiber (GF) or other reinforcing material. Advantageously, the housing or enclosure 2304 is consistent with a high signal level by the piezo device and/or high signal transmissivity through the housing 2304.

Figure 24:
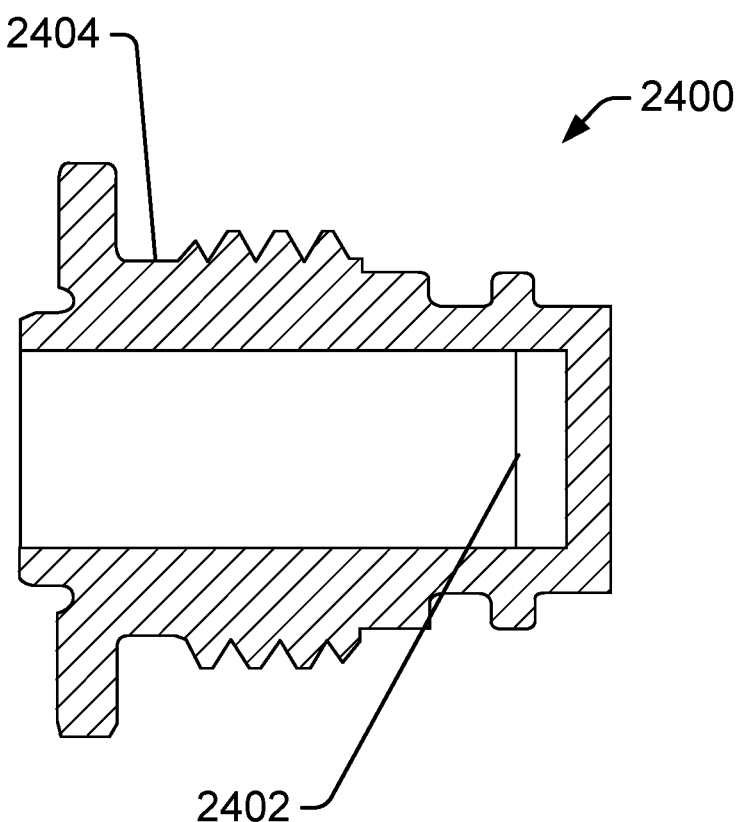

FIG. 24 shows an example sensor unit or transducer assembly 2400 including a transducer 2402. In the example, a piezo device 2402 is shown within the housing 2404. In the example, the housing 2400 of the transducer is made of a plastic that is approximately 40% percent glass fiber (e.g., 15% to 65% glass fiber). Advantageously, a plastic enclosure made with glass fiber provides high strength characteristics and high resistance to pressure.

Figure 25:
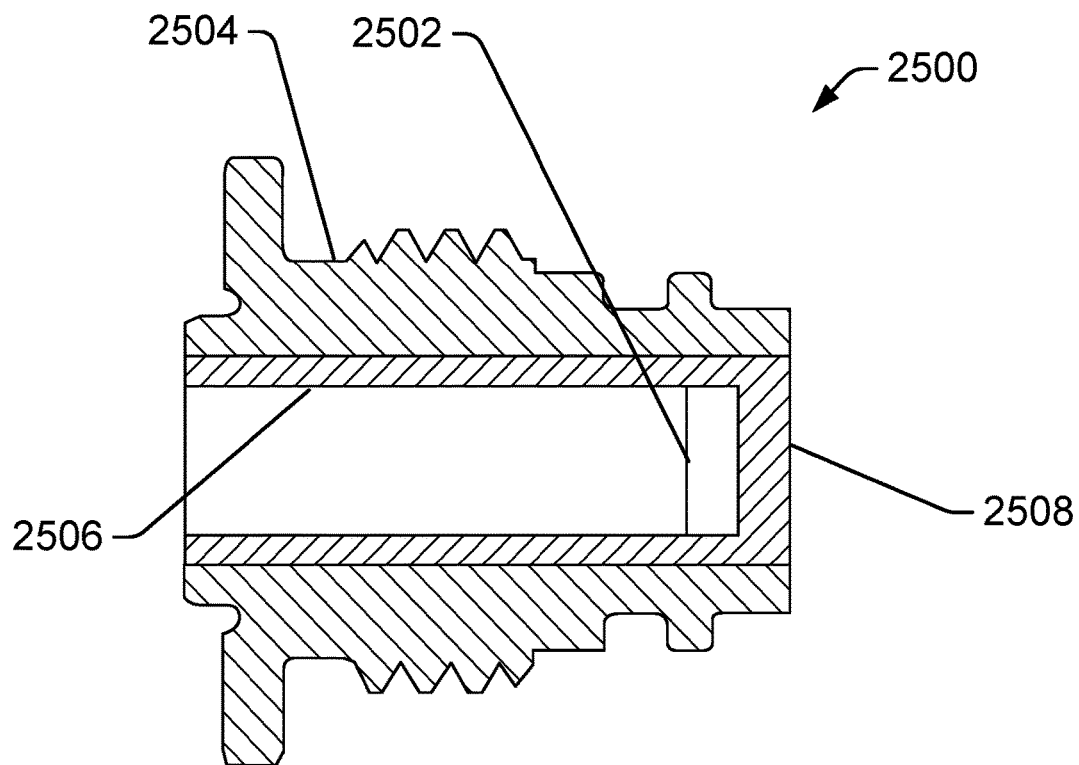

FIG. 25 shows an example sensor unit or transducer assembly 2500 including a transducer device 2502 (e.g., ultrasonic sensor such as a piezo device). In the example, a piezo device 2502 is shown within the housing. In the example, the housing has a bi-material design, including portions that are made of plastic with reinforcing material (e.g., glass fiber) and portions that are made of plastic without reinforcing material. In the example, an outer tube 2504 is made of plastic with fiber and forms a high-strength shell of the sensor unit 2500. An inner tube 2506 of the sensor unit 2500 made of plastic without fiber. The inner tube 2506 also forms, and/or is connected to, an end-portion or cap 2508, which is also made of plastic without fiber.

The sensor unit 2500 provides strength and excellent ultrasonic signal transmission characteristics. The outer tube 2504 has is stronger than the inner tube 2506, and results in a sensor unit 2500 having strength and resistance to pressure. The inner tube 2506 has better ultrasonic signal conduction than the outer tube 2504, and the fiber-free construction results in a higher signal level from an ultrasonic sensor or piezo device. Additionally, without variability in fiber content and distribution, the use of inner tubes made with non-fiber plastic results in high signal reproducibility and consistency. That is, the use of fiber-free inner sleeves 2506 and end-portions 2508 results in production of sensor units that are more similar or homogenous in signal detection and ultrasonic transducer response, due at least in part to their fiber-free construction. Additionally, due to the absence of glass fiber plastic in the inner tube 2506, water (e.g., drinking water) is not contact with glass fiber. Accordingly, the bi-material ultrasonic sensor unit 2500 results in production of transducer assemblies that provide excellent and consistent signal transmission from a pipe to a piezo device, high strength and water pressure resistance, and excellent protection against water contamination.

Figure 26:
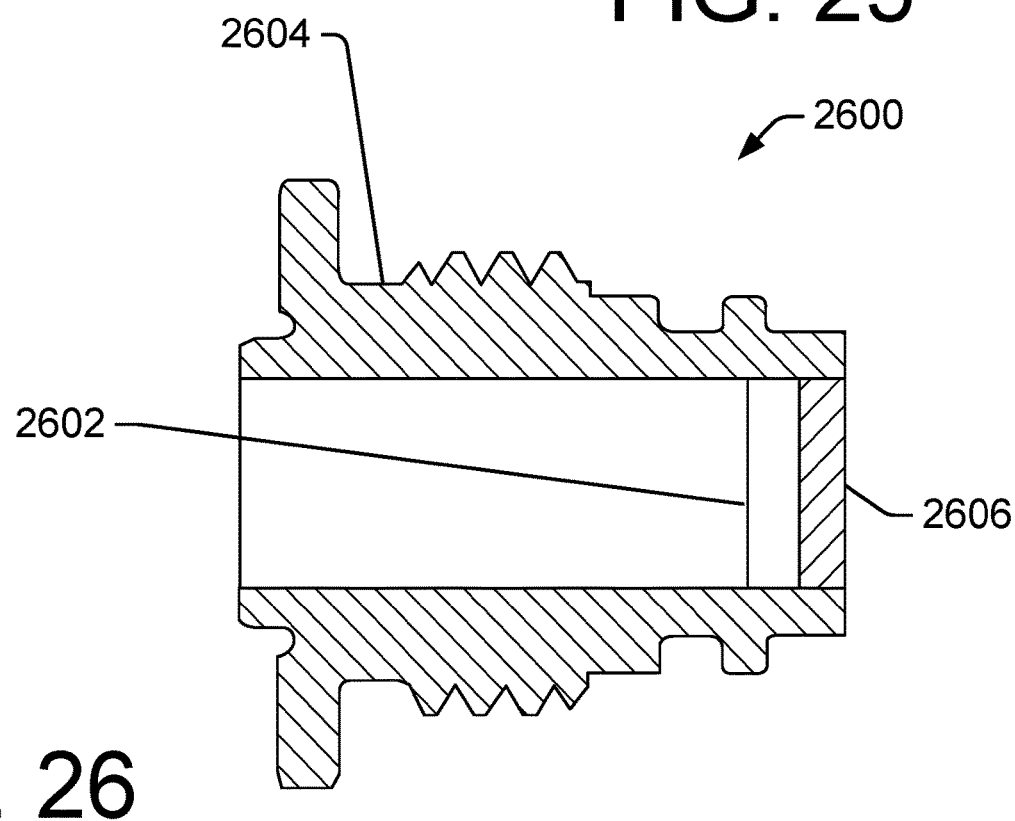

FIG. 26 shows an example sensor unit or transducer assembly 2600 including a transducer device 2602 (e.g., ultrasonic sensor such as a piezo device). In the example, a piezo device 2602 is shown within the housing. In the example, the housing has a bi-material design, including portions that are made of plastic with fiber and portions that are made of plastic without fiber. In the example, a tube 2604 is made of plastic with fiber, and forms a high-strength shell of the sensor unit 2600. An end-portion or end cap 2606 of the sensor unit 2600 made of plastic without fiber and provides excellent ultrasonic signal transmission from a pipe to an ultrasonic sensor device (e.g., a piezo device).

The transducer assembly 2600 includes both strength and good ultrasonic signal transmission. The tube 2604 has strength derived in part from a reinforced plastic, e.g., glass fiber design, and results in a sensor unit 2600 having considerable strength and resistance to pressure. The end-portion or end cap 2606 has better ultrasonic signal conduction than the tube 2604, and the fiber-free construction results better ultrasonic signal transfer from a pipe to an ultrasonic transducer device. Additionally, the transducer device will produce a more accurate and/or a higher signal level. Without variability in fiber content and distribution, the end-portion 2606 made of non-fiber plastic results in high signal reproducibility and consistency. Accordingly, the bi-material ultrasonic sensor unit 2600 results in production of transducer assemblies that provide excellent and consistent signal transmission from a pipe to a piezo device, and high strength and water pressure resistance and protection.

Examples of Multi-Material Transducer Enclosure

FIGS. 23 through 26 show examples of an enclosure for a transducer made of multiple materials, to provide strength and ultrasonic signal conduction.

In a first example, a transducer assembly includes a first tube, a second tube and an end-portion. In the example, the first tube may be made of a mechanically reinforced plastic material. The second tube may be made of a first unreinforced plastic material and may be disposed within the first tube. The end-portion may be made of a second unreinforced plastic material and may be connected to the second tube.

In an example, the mechanically reinforced plastic material comprises plastic with glass fiber.

In an example, the first unreinforced plastic material and the second unreinforced plastic material may include plastic free of glass fiber.

In an example, the first unreinforced plastic material and the second unreinforced plastic material may be the same material.

In an example, the first tube may be made of approximately 40% glass fiber by weight.

In an example, the second unreinforced plastic material of the end-portion attenuates an ultrasonic signal less than the mechanically reinforced plastic material of the first tube.

In an example, the transducer assembly may additionally include an ultrasonic transducer in contact with the end-portion.

In an example, the transducer assembly may additionally include a piezo electric transducer in contact with the end-portion.

In an example, the transducer assembly may additionally include an ultrasonic transducer. In the example, an outside diameter of the ultrasonic transducer is less than an inside diameter of the second tube and the ultrasonic transducer is coupled to the end-portion.

In an example, the first tube has greater mechanical resistance than the second tube and the second unreinforced plastic material of the end-portion attenuates an ultrasonic signal less than the mechanically reinforced plastic material of the first tube.

In a second example, a sensor unit for a meter may include a tube, a tube-end, and an ultrasonic transducer. The tube may be made of a mechanically reinforced plastic material. The tube-end may be made of an unreinforced plastic material. The ultrasonic transducer may be attached to the tube-end.

In an example, the tube is a first tube, and the sensor unit may additionally include a second tube. The second tube may be disposed within the first tube and may be made of the same material as the tube-end.

In an example, the mechanically reinforced plastic material may be made of plastic with glass fiber and the second tube and tube-end may be made of unreinforced plastic material.

In an example, the first tube has better mechanical resistance than the second tube and a material of the second tube and the tube-end attenuates a signal from a pipe less than a material of the first tube.

In an example, the mechanically reinforced plastic material and the unreinforced plastic material are made of a same resin type, but have differing levels of glass fiber and/or other mechanical reinforcement material.

In an example, the ultrasonic transducer is a piezoelectric transducer in contact with the tube-end.

In an example, the mechanically reinforced plastic material and the unreinforced plastic material are made of a same resin type and the mechanically reinforced plastic material comprises glass fiber.

In a third example, a transducer assembly may include a first tube, a second tube, and an end-portion. In the example, the first tube may be made of plastic with a reinforcing material and the second tube may be made of plastic, having less reinforcing material (e.g., glass fiber) than the plastic of the first tube or no reinforcing material (e.g., no glass fiber). In the example, the end-portion may be made of plastic without reinforcing material and may be connected to the second tube.

In an example, the transducer assembly may additionally include an ultrasonic transducer in contact with the end-portion. In the example, the plastic of the second tube and plastic of the end-portion may be made of plastic without glass fiber.

In an example, the plastic of the second tube has no glass fiber.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A transducer assembly, comprising:
   a transducer having a first wire and a second wire;
   a housing at least partially enclosing the transducer; and
   a plug disposed in an opening of the housing, the plug comprising:
      a first portion coupled to the opening of the housing;
      a second portion encircling the first wire and the second wire;
   wherein the second portion of the plug is movably coupled to the first portion of the plug, such that the second portion is movable from a first position in which the first wire and the second wire are recessed in the second portion, to a second position in which the first wire and the second wire protrude from the second portion.

2. The transducer assembly of claim 1, wherein:
   the second portion comprises a first wire guide and a second wire guide;
   the first wire guide and the second wire guide define a first channel and a second channel, respectively;
   the first wire and the second wire are located at least in part within the first channel and the second channel, respectively.

3. The transducer assembly of claim 1, wherein the first portion comprises a first frictional surface and the second portion comprises a second frictional surface, and wherein contact between the first frictional surface and second frictional surface resists movement of the second portion with respect to the first portion.

4. The transducer assembly of claim 1, wherein the first portion comprises a first frictional surface and the second portion comprises a second frictional surface in contact with the first frictional surface, and wherein movement overcoming friction between the first frictional surface and second frictional surface exposes portions of the first wire and portions of the second wire.

5. The transducer assembly of claim 1, wherein:
a first channel and a second channel are defined within the second portion;
when the second portion is in the first position, an end of the first wire and an end of the second wire are enclosed within the first channel and the second channel, respectively.

6. The transducer assembly of claim 1, wherein:
a first channel and a second channel are defined within the second portion;
when the second portion is in the second position, an end of the first wire and an end of the second wire extend out of the first channel and the second channel, respectively.

7. The transducer assembly of claim 1, additionally comprising:
a circuit board;
wherein when the second portion is in the second position, an end of the first wire and an end of the second wire extend out of a first channel defined in the second portion and a second channel defined in the second channel, respectively, by a distance sufficient for the first wire and the second wire to contact the circuit board.

8. The transducer assembly of claim 1, additionally comprising:
a stop disposed on the second portion to limit relative movement of the second portion with respect to the first portion.

9. A transducer assembly, comprising:
a transducer having a first wire and a second wire;
a housing at least partially enclosing the transducer; and
a plug disposed in an opening of the housing, the plug comprising:
a first portion coupled to the opening of the housing;
a second portion, comprising:
a first wire guide and a second wire guide; and
a first channel and a second channel defined in the first wire guide and the second wire guide, respectively;
wherein portions of the first wire and portions of the second wire are located at least in part within the first channel and the second channel, respectively.

10. The transducer assembly of claim 9, wherein the second portion of the plug is movably coupled to the first portion of the plug between a first position and a second position, such that an end of the first wire and an end of the second wire are encased in the first position and exposed when the second position.

11. The transducer assembly of claim 9, wherein the first portion comprises a first frictional surface and the second portion comprises a second frictional surface in contact with the first frictional surface.

12. The transducer assembly of claim 9, additionally comprising:
a circuit board;
wherein the second portion of the plug is movably coupled to the first portion of the plug between a first position and a second position, and wherein when the second portion is in the second position, an end of the first wire and an end of the second wire extend out of the first channel and the second channel, respectively, by a distance sufficient for the first wire and the second wire to contact the circuit board.

13. The transducer assembly of claim 9, additionally comprising:
a stop disposed on the second portion to limit relative movement of the second portion with respect to the first portion.

14. The transducer assembly of claim 9, wherein the first portion comprises a first frictional surface and the second portion comprises a second frictional surface, and wherein the first and second frictional surfaces are in contact.

15. A method of manufacturing a metering device, comprising:
attaching a housing of a transducer to a pipe;
attaching a printed circuit board (PCB) adjacent to the housing;
applying force to move a first portion of the housing to expose wiring of the metering device;
bending the wiring to contact the PCB; and
electrically connecting the wiring to the PCB.

16. The method of claim 15, wherein applying force to move the first portion comprises:
applying force to the first portion until a stop contacts a second portion of the housing.

17. The method of claim 15, wherein applying force to move the first portion comprises:
applying force to the first portion until a surface of the first portion is substantially planar with a surface of a second portion of the housing.

18. The method of claim 15, wherein applying force to move the first portion comprises:
applying force to break a seal of the housing.

19. The method of claim 15, wherein applying force to move the first portion comprises:
sliding the first portion against a second portion of the housing.

20. The method of claim 15, wherein applying force to move the first portion comprises:
sliding wire guides against wires of the metering device to thereby expose the wires.

* * * * *